US010427326B2

(12) United States Patent
Regelman et al.

(10) Patent No.: US 10,427,326 B2
(45) Date of Patent: Oct. 1, 2019

(54) SPECTRAL PROPERTIES-BASED SYSTEM AND METHOD FOR FEEDING MASTERBATCHES INTO A PLASTIC PROCESSING MACHINE

(71) Applicant: O.E.D.A. LIAD HOLDINGS (2006) LTD., Misgav Industrial Park (IL)

(72) Inventors: Vadim (Dan) Regelman, Kiryat Bialik (IL); Eli Margalit, Moshav Yaad (IL); Daniel Hofmann, Haifa (IL); Ofer Jacobovich, Tel Mond (IL); Aviad Adani, Moshav Yaad (IL)

(73) Assignee: O.E.D.A. LIAD HOLDINGS (2006) LTD., Misgav Industrial Park (IL)

( * ) Notice: Subject to any disclaimer, the term of this patent is extended or adjusted under 35 U.S.C. 154(b) by 55 days.

(21) Appl. No.: 15/115,828

(22) PCT Filed: Feb. 5, 2015

(86) PCT No.: PCT/IL2015/050130
§ 371 (c)(1),
(2) Date: Aug. 1, 2016

(87) PCT Pub. No.: WO2015/118535
PCT Pub. Date: Aug. 13, 2015

(65) Prior Publication Data
US 2017/0165873 A1    Jun. 15, 2017

(30) Foreign Application Priority Data

Feb. 6, 2014 (IL) .......................................... 230879

(51) Int. Cl.
*B29B 7/72* (2006.01)
*B29C 47/92* (2006.01)
(Continued)

(52) U.S. Cl.
CPC ................ *B29B 7/72* (2013.01); *B29B 7/603* (2013.01); *B29B 7/88* (2013.01); *B29C 45/76* (2013.01);
(Continued)

(58) Field of Classification Search
None
See application file for complete search history.

(56) References Cited

U.S. PATENT DOCUMENTS

| 4,684,488 A * | 8/1987 | Rudolph ........... B01F 15/00214 264/211.23 |
| 4,699,510 A | 10/1987 | Alguard |

(Continued)

FOREIGN PATENT DOCUMENTS

| EP | 0646409 A | 4/1995 |
| JP | S61186804 A | 8/1986 |

(Continued)

OTHER PUBLICATIONS

Anonymous: "Delta E—Versionsunterschied—Wikipedia", Oct. 30, 2013, Retrieved from the Internet: URL: https://de.wikipedia.org/w/index.php?title=delta_E&diff=152726034&oldid=12396925 (26 pages).

(Continued)

*Primary Examiner* — Nathan T Leong
(74) *Attorney, Agent, or Firm* — Roach Brown McCarthy & Gruber, P.C.; Kevin D. McCarthy

(57) ABSTRACT

A method and system for optimizing a match between the color of an in-line part manufactured by a plastic product production machine and the color of a reference part by adjusting the concentration of masterbatch in the mixture of raw material fed to the plastic product production machine. The optimization of the color is based on spectra of the in-line part and reference part obtained within a short time (Continued)

interval using the same spectrometer, thereby eliminating the requirement for high accuracy spectrometer calibration and allowing the method, which determines the rates at which the base masterbatches are added to the raw material, to be carried out in real time on the manufacturing floor while the plastic product production machine is being operated to manufacture in-line parts.

8 Claims, 20 Drawing Sheets

(51) Int. Cl.
| | |
|---|---|
| B29B 7/60 | (2006.01) |
| B29B 7/88 | (2006.01) |
| B29C 45/76 | (2006.01) |
| G01J 3/46 | (2006.01) |
| G01J 3/02 | (2006.01) |
| G01J 3/10 | (2006.01) |
| G01J 3/50 | (2006.01) |
| G01J 3/52 | (2006.01) |
| B29B 7/40 | (2006.01) |
| G01J 3/28 | (2006.01) |

(52) U.S. Cl.
CPC ............ *B29C 47/92* (2013.01); *G01J 3/0208* (2013.01); *G01J 3/0218* (2013.01); *G01J 3/0224* (2013.01); *G01J 3/0237* (2013.01); *G01J 3/0291* (2013.01); *G01J 3/0297* (2013.01); *G01J 3/10* (2013.01); *G01J 3/463* (2013.01); *G01J 3/50* (2013.01); *G01J 3/524* (2013.01); *B29B 7/40* (2013.01); *B29C 2947/926* (2013.01); *B29C 2947/92095* (2013.01); *B29C 2947/92457* (2013.01); *B29C 2947/92828* (2013.01); *G01J 2003/106* (2013.01); *G01J 2003/2873* (2013.01)

(56) References Cited

U.S. PATENT DOCUMENTS

| | | | |
|---|---|---|---|
| 5,003,500 A | 3/1991 | Gerber | |
| 5,103,401 A | 4/1992 | Johnson | |
| 5,568,266 A * | 10/1996 | Ciza | G01J 3/02 |
| | | | 250/226 |
| 5,723,517 A | 3/1998 | Campo | |
| 5,724,259 A * | 3/1998 | Seymour | B41F 33/0036 |
| | | | 101/211 |
| 5,883,708 A | 3/1999 | Jung et al. | |
| 6,285,453 B1 * | 9/2001 | Smith | B01F 13/1055 |
| | | | 250/226 |
| 6,688,493 B2 | 2/2004 | Margalit | |
| 6,750,971 B2 * | 6/2004 | Overbeck | A61B 1/00052 |
| | | | 356/405 |
| 6,966,456 B2 | 11/2005 | Margalit | |
| 2005/0018187 A1 | 1/2005 | Slutter et al. | |
| 2009/0009759 A1 | 1/2009 | Backman et al. | |
| 2013/0100439 A1 | 4/2013 | Yu et al. | |
| 2013/0250322 A1 | 9/2013 | Kawabata et al. | |

FOREIGN PATENT DOCUMENTS

| | | |
|---|---|---|
| JP | H0420821 A | 5/1990 |
| JP | H07173295 A | 7/1995 |
| JP | H07318488 A | 12/1995 |
| JP | H110142057 A | 5/1998 |
| JP | 2007285930 A | 11/2007 |
| JP | 2007534965 A | 11/2007 |
| JP | 2008089579 A | 4/2008 |
| JP | 2008233024 A | 10/2008 |
| JP | 2011059059 A | 3/2011 |

OTHER PUBLICATIONS

Supplementary European Search Report from a foreign patent office in a counterpart foreign application (EP 15 74 6169), dated Sep. 4, 2017, 9 pages.
International Search Report from a counterpart foreign application—PCT/IL2015/050130—dated May 28, 2015; 4 pages.
Written Opinion of the International Searching Authority from a counterpart foreign application—PCT/IL2015/050130—dated May 28, 2015; 7 pages.
Georg A. Klein, "Industrial Color Physics", Springer 2010, p. 326-337 (520 pages).
Office action from a Japanese patent office in a counterpart foreign application—2016-550595—dated Jan. 16, 2019—Japanese version is 6 pages; English translation version is 5 pages.
A communication from a foreign patent office—European Patent Office—in a counterpart foreign application—EP Patent Application No. 15746169.0—dated Mar. 20, 2019 (7 pages).

* cited by examiner

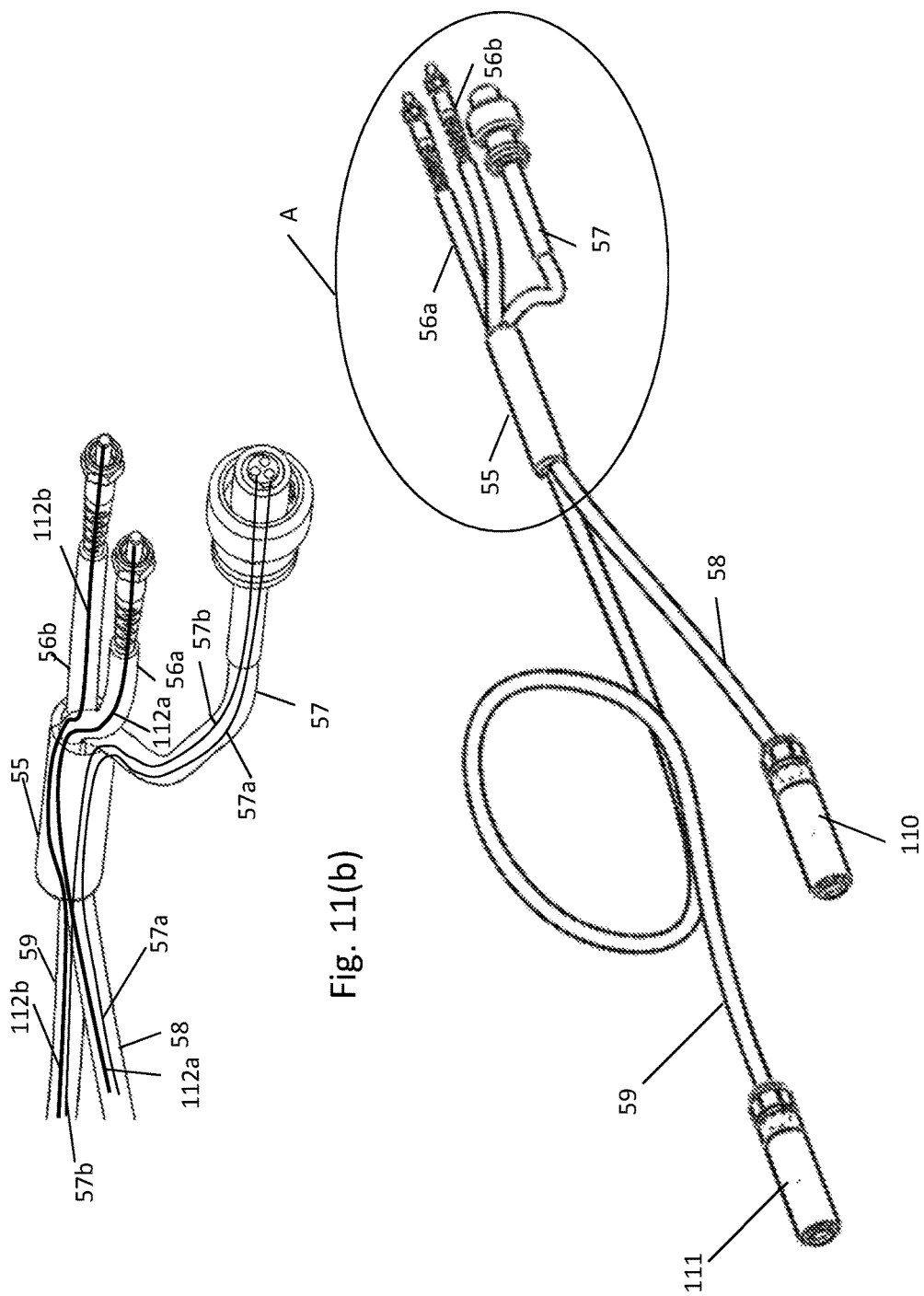

SPECTRAL PROPERTIES-BASED SYSTEM AND METHOD FOR FEEDING MASTERBATCHES INTO A PLASTIC PROCESSING MACHINE

FIELD OF THE INVENTION

The present invention relates to the dispensing of additive material into plastic processing machines in the plastics industry. In particular, the present invention discloses a method and system for optimizing the amount of fed color additive materials (color masterbatches) by in-line measurement of the molded product spectral properties, comparing them to a reference material and controlling the feeding device of the dispensing system by using the signal obtained from the comparison and the processing of spectral properties.

BACKGROUND OF INVENTION

In the modern world, plastics are the material of choice for the manufacture of a seemingly unlimited number of products. These products are produced by a variety of industrial processes, e.g. injection molding, blow molding, extrusion, and 3-D printers. The raw material that is fed into the machines used to produce the final products is a mixture consisting of: polymers (called resin or virgin in the industry) in the form of small beads, colorants and other additives, e.g. UV inhibitors. The colorants and other additives are supplied as masterbatches, which are concentrated mixtures of pigments and/or additives encapsulated during a heat process into a carrier resin which is then cooled and cut into a granular shape.

Herein the term "masterbatch" is used to refer to a masterbatch that contain pigment, i.e. color masterbatch, and the term "base material" is used to refer to polymers or mixtures of polymers.

Herein the term "screw" is used to refer to a screw, dosing mechanism, auger, belt conveyer, or vibratory mechanism of the dispensing system In order to dispense the required amount of the additives material—mainly color masterbatch—to be mixed with the base material volumetric or gravimetric are commonly utilized. One or more such feeders are installed on the throat of the plastic processing machine.

The volumetric system releases a pre-defined volume of additive/masterbatch into the mixing machine. The advantage of this system is implementation simplicity by using a feeding screw, where the released volume is calibrated to the screw rotation speed. This method compromises accuracy for simplicity, since the exact weight (calculated to be volume multiplied by density) of the released masterbatch material for the same rotation speed varies with the masterbatch density, granule size and other parameters.

U.S. Pat. Nos. 5,103,401, 6,688,493B2 and 6,966,456B2 describe gravimetric methods. The gravimetric methods add a weighing mechanism with a control system to the feeding screw, and then, periodically the exact weight of the released material is measured. The difference between the actual weight and the set point is used as the error signal for the control electronics. The gravimetric method has much greater accuracy compared to the volumetric method, resulting in saving of masterbatch material. A gravimetric system allows the material to be released exactly in the amount defined by the set point, usually defined in mass per time unit or percent of the base material. A prior art gravimetric system is shown schematically in FIG. 1.

In both the volumetric and gravimetric cases the masterbatch material set point is defined empirically and no actual measurements of the properties of the mixture are made in-line to confirm/adjust it.

Precision color measurement based on optical spectrum is an extremely challenging process, since fractions of percent of calibration accuracy are required in order to achieve color accuracy better than the color resolution of the human eye.

It is therefore an object of the present invention to provide a method and a system for adjusting and controlling the masterbatch release rate according to an in-line measurement of spectral properties of a product to fit a pre-defined spectral signature of a given reference sample.

SUMMARY OF THE INVENTION

In a first aspect the invention is a method for optimizing a match between the color of an in-line part manufactured by a plastic product production machine and the color of a reference part by adjusting the concentration of masterbatch in the mixture of raw material fed to the plastic product production machine. The method comprises:
  a. measuring the spectrum of the in-line part with a spectrometer;
  b. measuring the spectrum of the reference part with a spectrometer;
  c. determining the color coordinates of the in-line part and the reference part from the spectra measured in steps a and b;
  d. determining the color coordinates of a set point, which corresponds to the lowest concentration of masterbatch required to make the color of the in-line part indistinguishable to the human eye from the color of the reference part;
  e. determining the distance $\Delta E$ between the color coordinates of the in-line part and the color coordinates of a set point determined in step d;
  f. determining a signal for controlling the feed speed of the mechanism that adds masterbatch to the mixture of raw material fed to the plastic product production machine; and
  g. controlling the feed speed of the mechanism that adds masterbatch to the mixture of raw material fed to the plastic product production machine by means of the signal determined in step f.

Steps a and b are carried out within a short time interval using the same spectrometer, thereby eliminating the requirement for high accuracy spectrometer calibration and allowing steps a to g of the method to be carried out in real time on a manufacturing floor while the plastic product production machine is being operated to manufacture in-line parts.

In embodiments of the method of the invention the set point is the lowest saturation point on the MacAdam ellipse around the reference material sample color. The set point can be found in one of the following ways:
  a. by maximizing the distance from the boundaries of the chromaticity diagram;
  b. by minimizing the distance from the color coordinates of the in-line part to the white center point 223; and
  c. by mathematical definition of saturation (S) value by transformation from xyY color space into the HSV color space.

In embodiments of the method of the invention the set point is determined by means of an iterative process.

In embodiments of the method of the invention the distance ΔE between the in-line color part and the set point on the chromaticity diagram is determined using the CIEDE2000 formula.

In embodiments of the method of the invention the signal for controlling the feed speed of the mechanism that adds masterbatch to the mixture of raw material fed to the plastic product production machine is defined as $$Err = \Delta E * f(S_0 - S),$$

where $S_0$ and $S$ are saturation values of the reference sample and the in-line part colors respectively, and $f(S_0-S)=f(x)$ is a weighting function.

In embodiments of the method of the invention the color of the in-line part is determined by the combination of three base masterbatches and the signals for controlling the feed speed of the mechanism that adds masterbatch to the mixture of raw material fed to the plastic product production machine are determined by projecting the ΔE vector on the axes defined by vectors connecting the locations of the base masterbatches on the chromaticity diagram.

In a second aspect the invention is a system for controlling the concentration of at least one base masterbatch in the mixture of raw material fed to a plastic product production machine in order to optimize the match of the color of an in-line part manufactured by the plastic product production machine to the color of a reference part. The system comprises:

a. at least one white light source;
b. at least one measurement head for configured for measuring the spectrum of an in-line part;
c. at least one measurement head configured for measuring the spectrum a reference part;
d. a spectrometer;
e. a network adapted to provide illumination light from the at least one light source to each of the measurement heads;
f. an optical network to guide return light that is either reflected from the surface of or transmitted through the in-line and reference parts from each of the measurement heads to the spectrometer;
g. a spectrum processing and control unit configured to receive electric signals representative of the spectra of the in-line and reference parts from the spectrometer, to process the signals and to determine error signals that are sent to at least one feed controller;
h. at least one feed controller for each base masterbatch, each feed controller configured to receive an error signal from the spectrum processing and control unit and to send it to a masterbatch feed controller; and
i. at least one masterbatch feed controller for each base masterbatch, each masterbatch feed controller configured to adjust the concentration of the base masterbatch in the mixture of raw material fed to the plastic product production machine by optimizing the rate at which the base masterbatch is added to the raw material.

The system is configured to measure the spectra of the in-line part and reference part within a short time interval using the same spectrometer, thereby eliminating the requirement for high accuracy spectrometer calibration and allowing the rates at which the base masterbatches are added to the raw material to be adjusted in real time on the manufacturing floor while the plastic product production machine is being operated to manufacture in-line parts.

In embodiments of the system of the invention the measurement heads comprise light baffles and polarizers to reduce the effects of specular reflections and stray light.

In embodiments of the system of the invention at least one light source is located in each measurement head and the optical network for return light is comprised of optical elements composed of at least one of each of at least one of the following: lenses, mirrors, beam splitters, cosine correctors, and homogenizers.

In embodiments of the system of the invention at least one light source is located in each measurement head and the optical network for return light from each measurement head is comprised of optical fibers and a N×1 optical fiber combiner is used to combine the separate optical fibers from each measurement head into a single optical fiber that is connected to the input of the spectrometer.

In embodiments of the system of the invention only one measurement head and a mechanism for alternately moving one of the reference part or the in-line part under the beginning of the optical network for returning light to the spectrometer.

Embodiments of the system of the invention comprise a single light source and a network of optical fibers adapted to distribute light from the light source to each of the measurement heads, in these embodiments the network comprises one of:

a. a 1×N optical fiber splitter which divides light from a single fiber that is optically coupled to the light source to one or more fibers that conduct light from the optical fiber splitter to the measurement heads; and
b. an apparatus located in front of the light source comprising a motor and a rotatable disk comprising at least one hole or slit the apparatus configured such that when the motor is activated to rotate the disk light is able to enter only one of a plurality of optical fibers that each lead to a measurement head at a time.

Embodiments of the system of the invention comprise a plurality of reference samples located on a mechanism configured to place one of the reference samples at a time opposite a measurement head.

In embodiments of the system of the invention the spectrometer is a Czerny-Turner monochromator comprising a grating to diffract the return light from the measurement heads, a linear sensor array at its output to detect the diffracted light, and a corrector element or elements to compensate for aberrations of the optical elements.

Embodiments of the system of the invention comprise a measurement head for use in reflective measurements from a sample located a distance h from the front surface of a lens having focal length f and both the end facets of illumination and light return (collection) fibers are located near the focal point on the back side of the lens, wherein $h \leq f$.

Embodiments of the system of the invention comprise a measurement head for use in transmissive measurements from a sample whose front side is located a distance $h_1$ from the front surface of a first lens having focal length $f_1$ and the end facets of either the illumination or the light return (collection) fibers is located near the focal point on the back side of the first lens, wherein $h_1 \leq f_1/2$ and the back side of the sample is located a distance $h_2$ from the front surface of a second lens having focal length $f_2$ and the end facets of the other of the illumination or light return (collection) fibers is located near the focal point on the back side of the second lens, wherein $h_2 \leq f_2/2$.

All the above and other characteristics and advantages of the invention will be further understood through the following illustrative and non-limitative description of embodiments thereof, with reference to the appended drawings.

BRIEF DESCRIPTION OF DRAWINGS

FIGS. 11(a) and 11(b) schematically show in more detail an example of an optical probe assembly comprising two measurement heads such as shown in FIG. 5;

DETAILED DESCRIPTION OF THE INVENTION

The present invention is a method and system for optimizing the amount of fed color masterbatches in a plastic product production line by in-line measurement of the spectral properties of the product and a reference object, processing of spectral properties of the product and reference object, comparing the processed spectral properties, and controlling feeding screws by using the signals obtained from the. Implementation of the method of the invention by using a spectrometer based system with robust calibration-free differential measurement of the manufactured part and the reference part is also disclosed.

Figure 1:
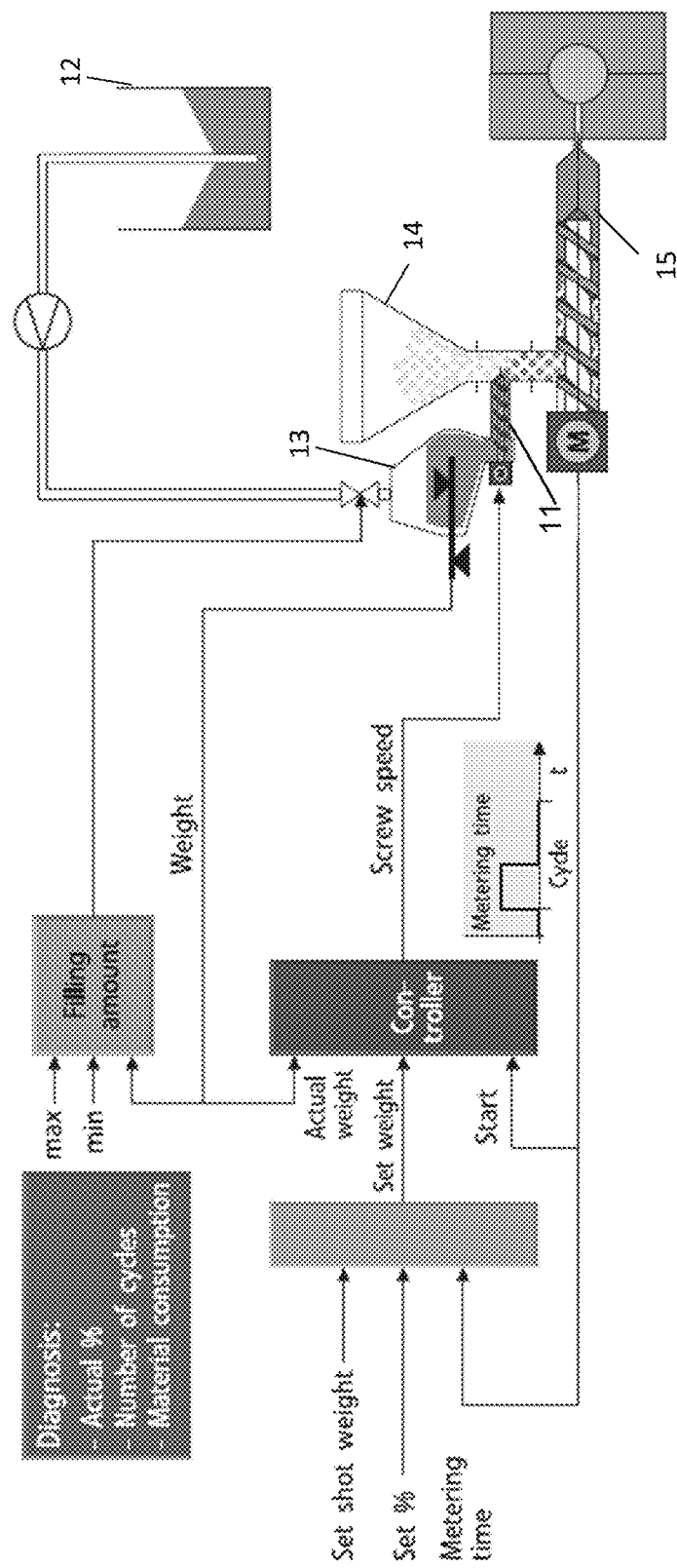
FIG. 1 schematically shows a gravimetric additive feeder system for an injection molding machine according to the prior art.

FIG. 1 schematically shows a prior art gravimetric additive mixing system. The feed screw 11 meters masterbatch or another additive into the main flow of material. The masterbatch is drawn from supply container 12 into hopper 13 where it is weighed with a loss-in-weight balance and distributed in the flow of base material out of hopper 14. Metering of the masterbatch is synchronized with the molding machine's feed screw 15.

Since it is impossible in most of the cases to weigh a discrete portion of the additive that is fed during a cycle time due to its tiny weight and the very noisy and shaky environment of the production area, the system uses a closed loop feedback operation to control the weight of the portion by weighing a number of dispensed portions using loss-in-weight of the hopper, dividing the weight by the number of portions and, controlling the speed of the screw feeder motor to dispense in a given time portions each with a predetermined weight for a given interval of time.

Figure 2A:
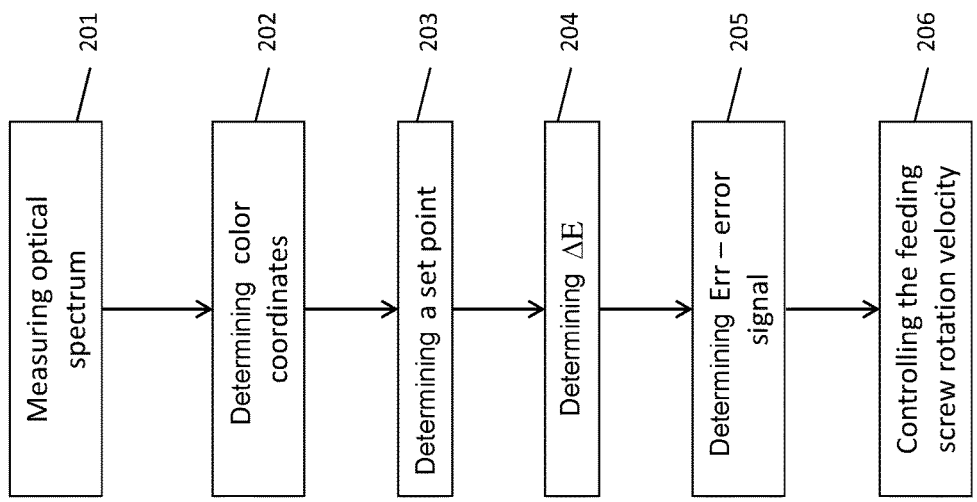
FIG. 2(a) schematically shows a calculation method of the reference and the part color coordinates from the spectrum data according to an embodiment of the invention.
Figure 2B:
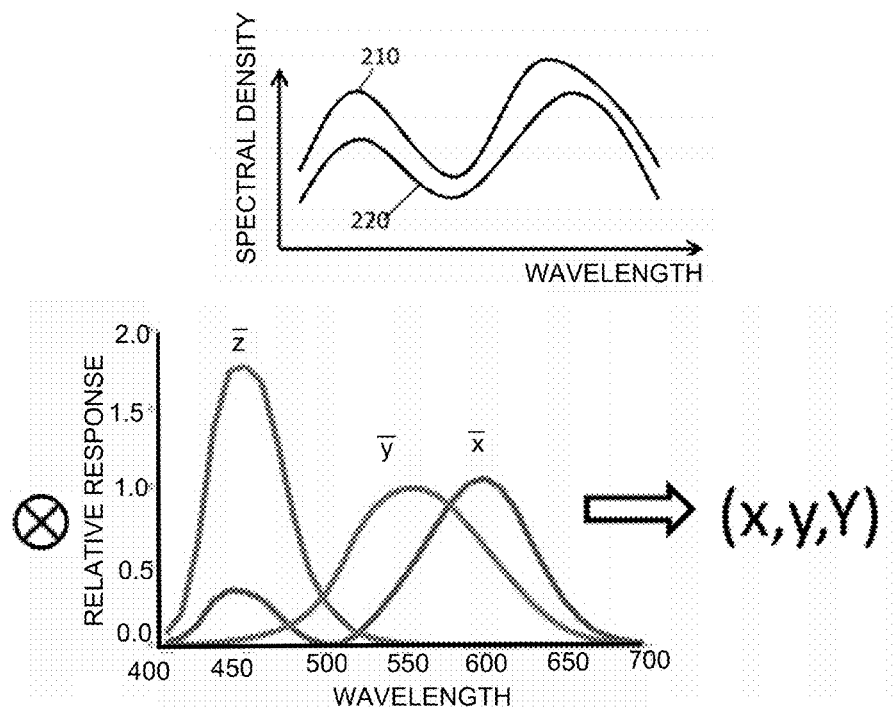
FIGS. 2(b)-2(c) schematically shows a derivation of the optimal error signal for the screw control loop on the chromaticity diagram, based on minimum saturation requirement, corresponding to the minimum consumption of the color masterbatch, lying within MacAdam ellipse of undistinguishable colors, according to an embodiment of the invention.

FIG. 2(a) schematically shows a method for optimal control of the feeding screw speed according to an embodiment of the present invention. In the first step 201 an optical spectrum is measured for a reference material part and for an in-line part. FIG. 2(b) shows the optical spectrum of the reference part 210 and of the in-line part 220 and the color response functions. In the second step 202 the color coordinates of the in-line part (x, y, Y) and of the reference material (x0, y0, Y0) in xyY color space are determined as follows:

$$X = \int_{380}^{780} I(\lambda) \bar{x}(\lambda) d\lambda$$

$$Y = \int_{380}^{780} I(\lambda) \bar{y}(\lambda) d\lambda$$

$$Z = \int_{380}^{780} I(\lambda) \bar{z}(\lambda) d\lambda$$

where $I(\lambda)$ is the spectral power density of the measured sample. The obtained coordinates are translated into the CIE xyY color space which can be seen in FIG. 2(c), by well-known linear transformation. Where $\bar{x}$, $\bar{y}$, $\bar{z}$, are standard observer color matching functions and the transformation from XYZ to xyY is:

$$x = \frac{X}{X+Y+Z}$$
$$y = \frac{Y}{X+Y+Z}$$
$$Y = Y$$

Figure 2C:
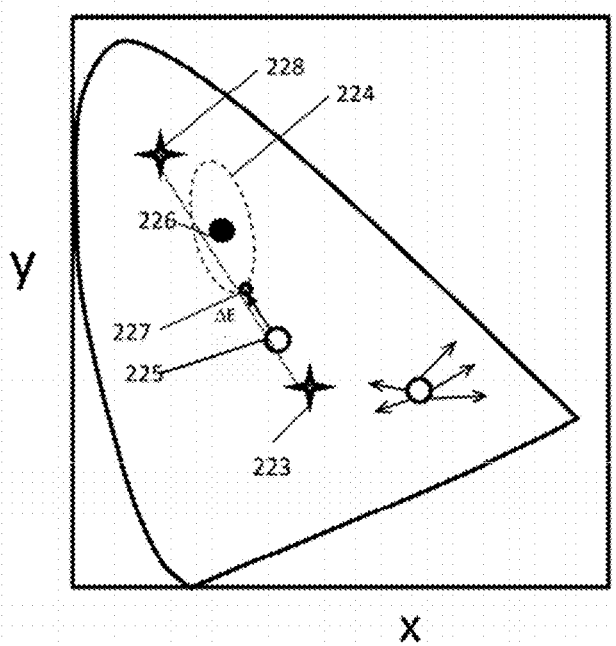

FIG. 2(c) shows the chromaticity diagram. The "star" point 228 is the color coordinates of the masterbatch material. Point 225 and point 226 are the color coordinates received in step 202 of the in-line part and the reference part respectively. Star 223 in the center of the chromaticity diagram is the white color, which is the lowest saturation value point. As a first approximation, varying the masterbatch concentration will move the color coordinate of the in-line part along the dashed line. The maximum saturation value colors are located on the boundaries. To achieve higher saturation value, more color masterbatch should be added to the base material.

A human eye cannot differentiate colors within a certain area 224, called the MacAdam ellipse, surrounding a point on the chromaticity diagram. The size of the ellipse varies with the location of the point on the chromaticity diagram. Boundaries of the undistinguishable colors region are defined by the CIEDE2000 standard.

In step 203 a set point 227 is determined. The set point 227 is the lowest saturation point on the undistinguishable color boundary. i.e. the MacAdam ellipse, around the reference material sample color 226 (x0,y0,Y0). The saturation point corresponds to the lowest concentration of masterbatch required to make the color of the in-line part indistinguishable to the human eye from the color of the reference part. The lowest saturation point can be found by maximizing the distance from the boundaries of the chromaticity diagram or by minimizing the distance from the color coordinates of the in-line part to the white center point 223 or by mathematical definition of saturation (S) value by transformation from xyY color space into the HSV color space.

In step 204, using the CIEDE2000 formula the distance ΔE between the in-line part color 225 and the above defined set point 227 is determined. In step 205 the signal used for controlling the feeding screw rotation speed is calculated. This signal is defined as:

$$Err = \Delta E * f(S_0 - S),$$

where $S_0$ and S are saturation values of the reference sample and the in-line part colors respectively, and $f(S_0-S)=f(x)$ is a weighting function, which, for example, can take the values: $f(x)=-1$, if $x<-1$; $f(x)=1$, if $x>1$ and $f(x)=x$ otherwise.

In the last step 206, the error signal is used to control the feeding screw rotation speed.

FIG. 2(d) provides a refined method for determination of the optimal feeding screw error input, based on the fact that the color resulting from various pigment (masterbatch) concentrations does not follow a straight line but follows a curved path 238 as shown in FIG. 2(c). The more exact behavior is described by a well know Kubelka Munk model (see for example Georg A. Klein, "Industrial Color Physics", Springer 2010, pg. 326-337). In this case the initial error is evaluated following the straight line between the color coordinates of the in-line part 225 and those of the reference part 226 resulting in a correction $\Delta E_1$ in the same manner as described in the FIG. 2(c). The color of the in-line part resulting from the masterbatch concentration adjusted using $\Delta E_1$ will not lie on the MacAdam ellipse 224 but will have coordinates 229. From this point, the error is evaluated again using a straight line between points 229 and 224 and the process is iterated, until the in-line part color coordinate crosses the MacAdam ellipse 224 (or its approximation by some constant ΔE value, typically about 2.5) from the low saturation side. The actual end result of this method is that the resulting in-line part color coordinate is 210 instead of 227 as is expected from the simpler model of FIG. 2(c).

Figure 2:
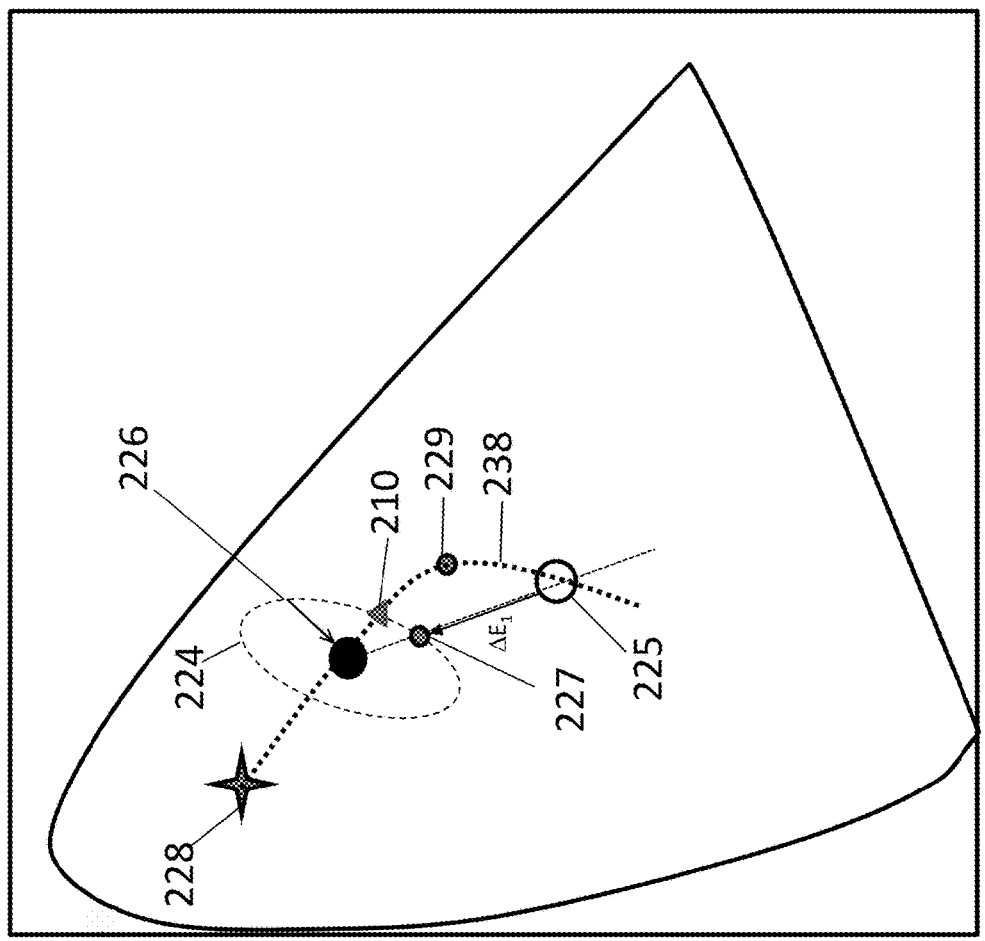
FIG. 2(d) schematically shows an additional algorithm for derivation of the optimal error signal for the screw control loop on the chromaticity diagram, based directly on the minimum consumption of the color masterbatch, lying within MacAdam ellipse of undistinguishable colors, according to an embodiment of the invention.
Figure 3:
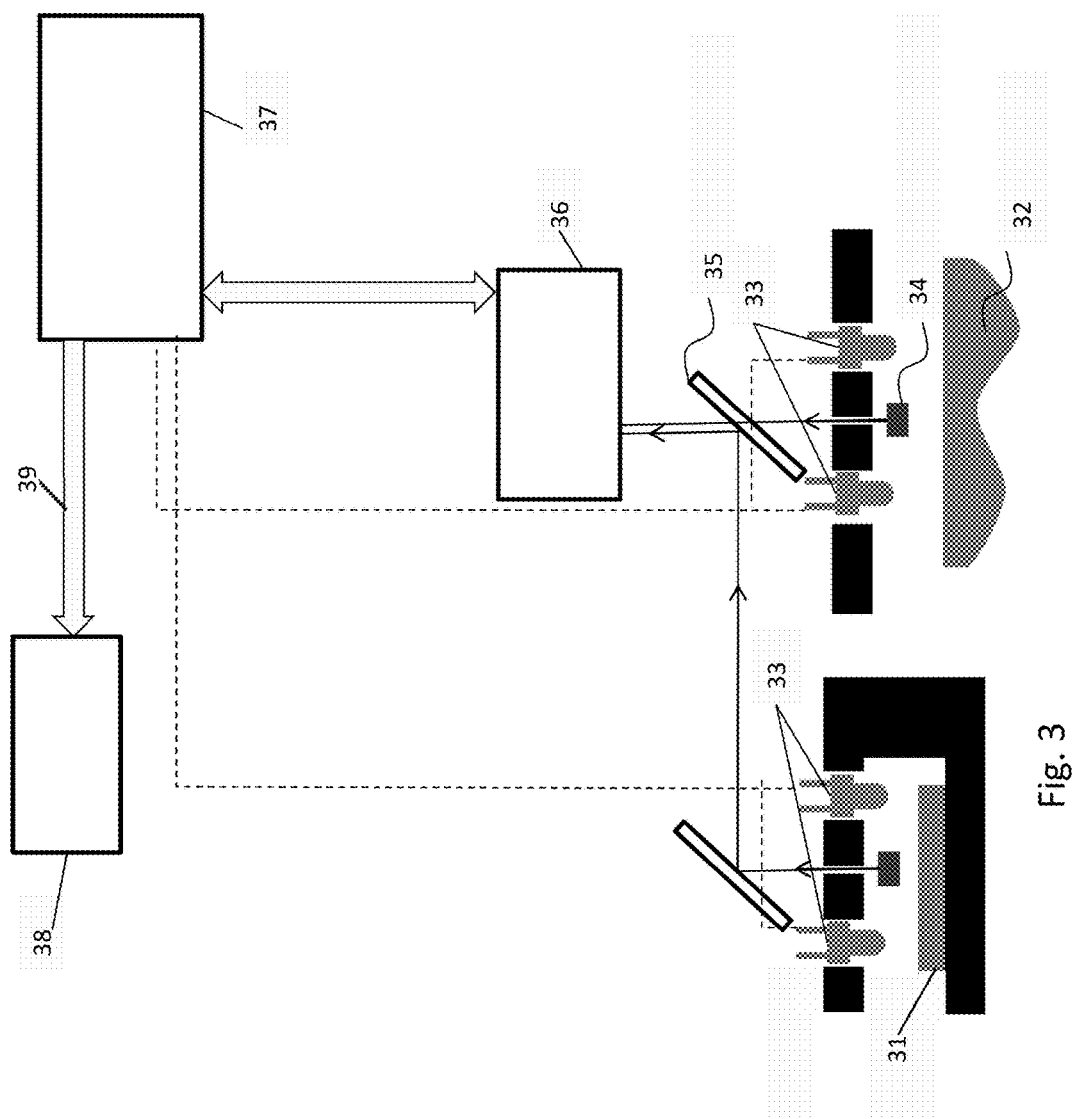
FIG. 3 shows a schematic layout of the comparative spectral measurement based masterbatch feeding screw control system concept according to an embodiment of the invention.

FIG. 3 shows a system according to an embodiment of the present invention. A schematic layout of the comparative spectral measurement based masterbatch feeding screw control system is shown. Precision color measurement based on optical spectrum is an extremely challenging process, since fractions of percents of calibration accuracy are required. Due to this fact, spectrometers are rarely used on manufacturing floors, but rather in analytic and quality control laboratories, since maintaining those high accuracy calibrations is rather impractical on manufacturing floors. The method of the present invention which is described above in FIG. 2 is implemented by measuring the reference sample and the in-line part spectrum simultaneously using the same spectrometer. In this case deviations from nominal spectrometer calibration are the same for both the measurement and the reference; that is no high accuracy spectrometer calibration is required. Due to a control feedback loop used for the feeding screw control, color difference error inaccuracy resulting from the spectrometer calibration deviation turns out to be insignificant.

The schematic layout of the differential spectrometer, which measures the in-line part and the reference part while comparing their color coordinates, is shown in FIG. 3). The optical signals reflected back from the measurement heads for the reference material part 31 and the in-line sample 32 are combined by 50%/50% beamsplitter 35 and sent to a spectrometer 36. Each measurement head utilizes a white light source 33 (implemented by LED, halogen lamp, fluorescent lamp, incandescent source, supercontinuum laser or any other wide spectrum light source). A cosine corrector or homogenizer 34 is used on the entrance into the light collection optics in order to minimize the spectrum dependence on the measurement geometry. The light sources 33 for the reference and in-line measurement heads are operated intermittently while enabling interlaced the measurement of the reference sample and the in-line part spectra. Both spectra are analyzed in the spectrum processing and illumination control unit 37, according to the method of the present invention as described above and the resulting value of the "error signal" 39 is sent to the feeding screw rotation velocity controller 38.

Figure 4A:
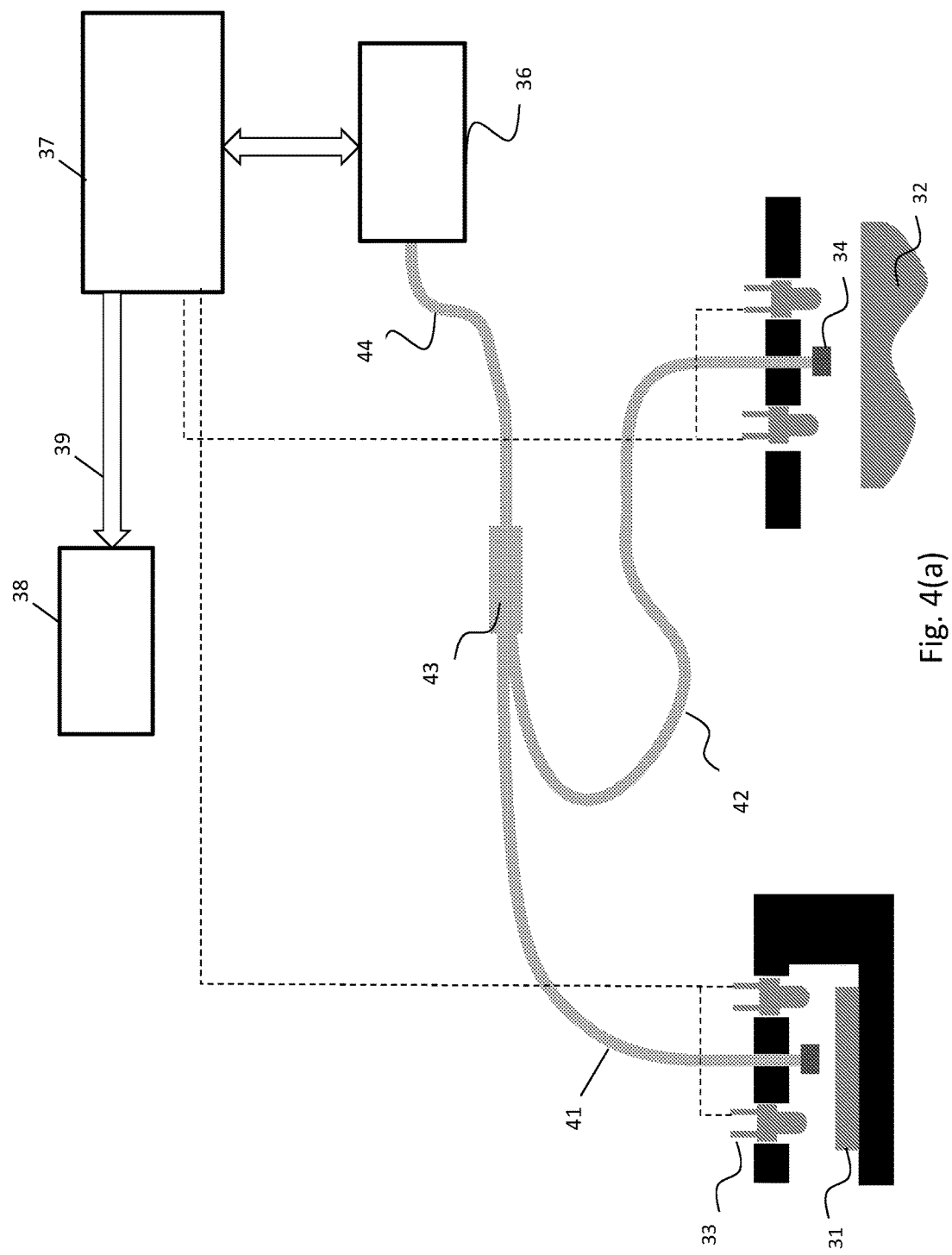
FIG. 4(a) schematically shows an external lighting optical fiber based implementation example of the comparative spectral measurement masterbatch feeding screw control system, according to an embodiment of the invention.

FIG. 4(a) schematically shows an example of another implementation of the system of the present invention according to an embodiment of the invention, wherein the light is collected from both measurement heads for both samples 31, 32 using optical fibers 41 and 42, combined by 2×1 fiber combiner 43 and conducted through optical fiber 44 to the spectrometer 36.

Figure 4B:
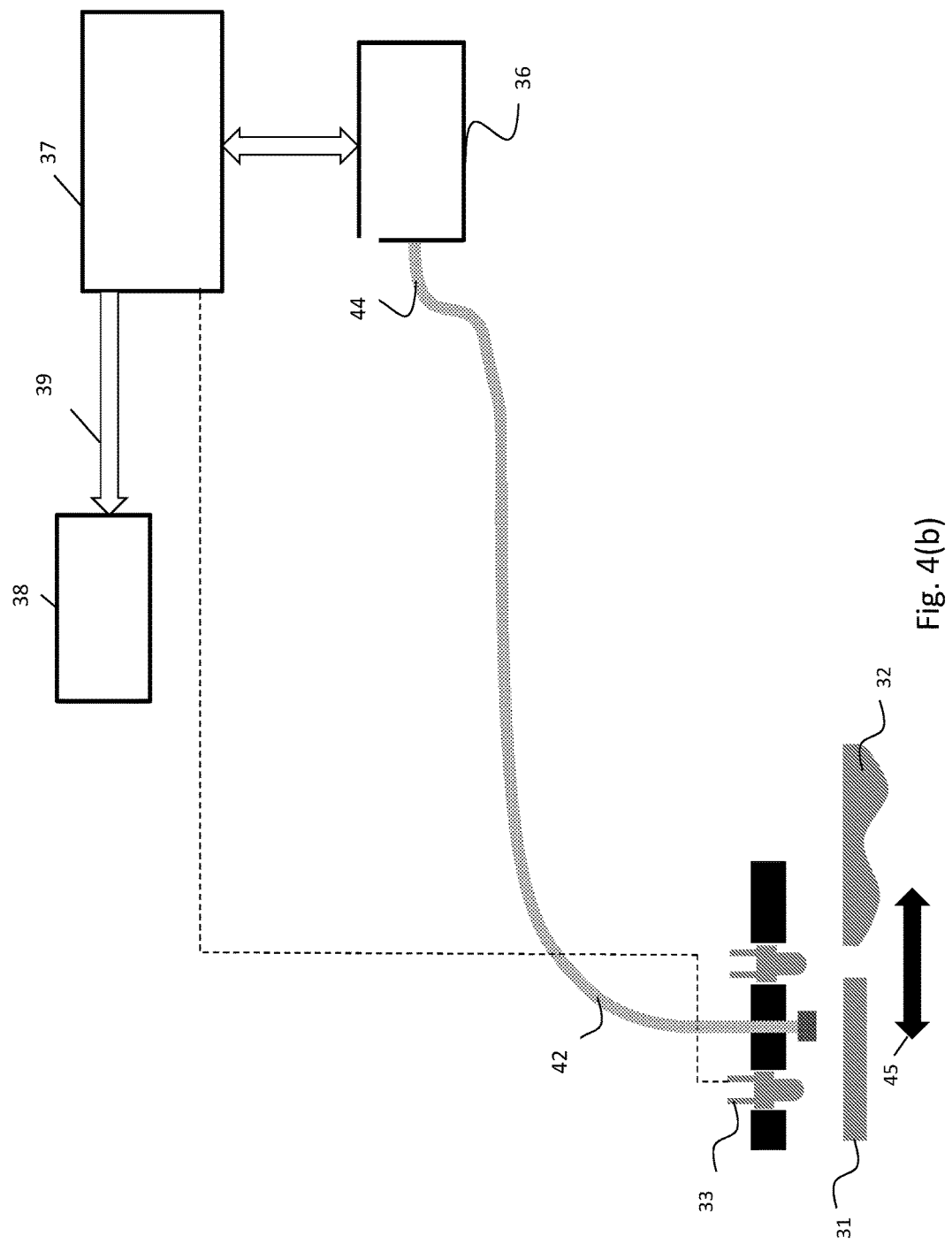
FIG. 4(b) schematically shows an alternative implementation of the comparative spectral measurement masterbatch feeding screw control system according to an embodiment of the invention, when the reference sample is periodically measured with the same spectrometer as the in-line manufactured parts.

FIG. 4(b) schematically shows an alternative implementation of the system using a single spectral measurement head for both the reference part 31 and the in-line part 32. A mechanism, symbolically shown by double headed arrow 45, periodically moves the in-line part 32 to the side and moves the reference part 31 under the measurement head to measure its color spectrum. The parameters of the color of the reference part are stored in the memory and used for calculating the feeding screw control error in the manner as disclosed in FIG. 2.

Figure 4C:
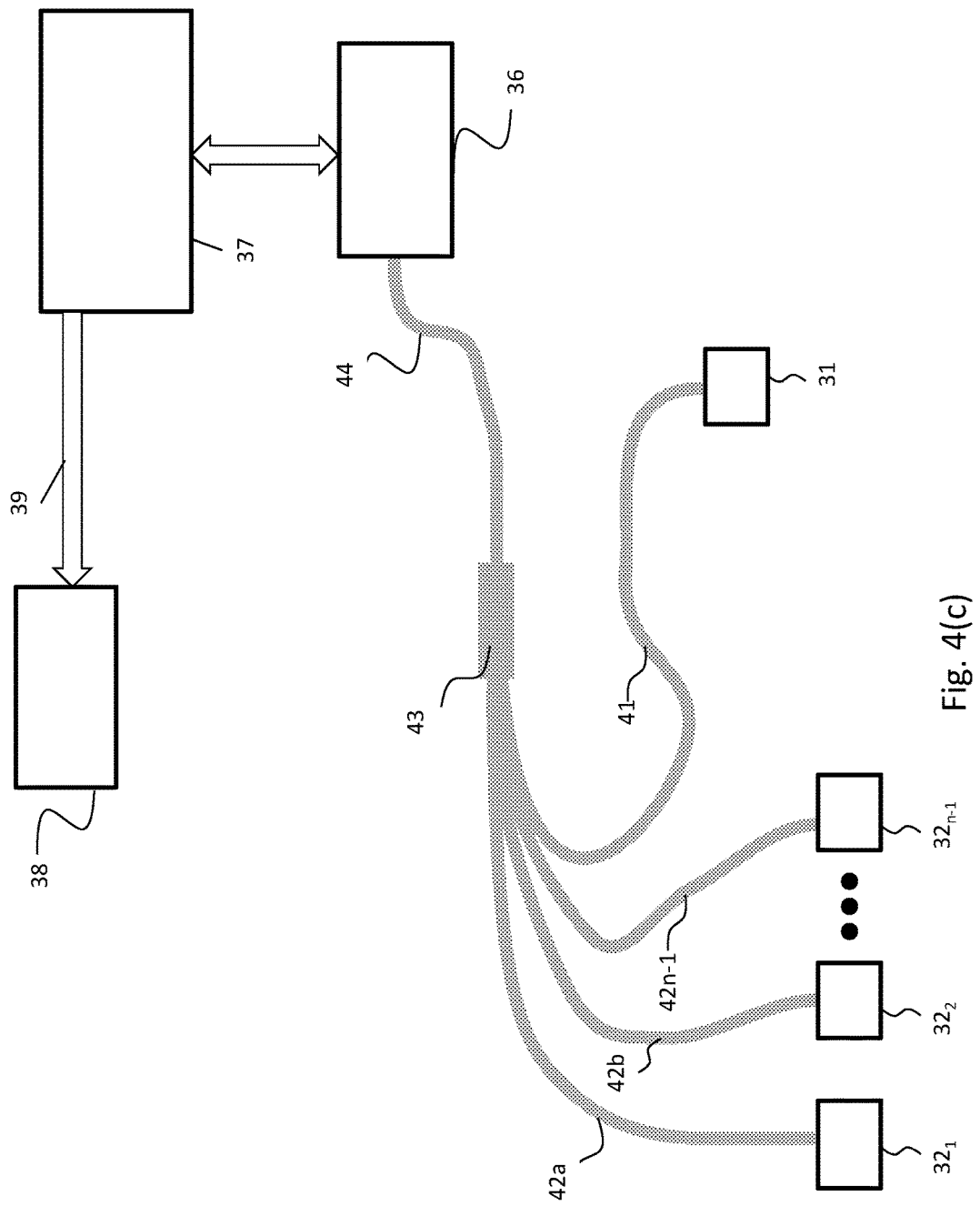
FIG. 4(c) schematically shows an external lighting optical fiber based implementation example of the comparative spectral measurement system with multiple measurement heads, according to an embodiment of the invention.

FIG. 4(c) schematically shows an example of an implementation of the system according to an embodiment of the invention. According to this embodiment of the invention the system utilizes multiple (more than 2) measurement heads for measuring the in-line part samples $32_1$, $32_2$ . . . $32_{n-1}$ at different locations in order to evaluate the color homogeneity for quality assurance. In this embodiment the feeding screw control 38 uses the average signal of all measurement heads, their scatter and their color deviation from the reference part 31. N×1 fiber combiner 43 is utilized to combine the multiple n−1 measurement heads into a single fiber attached to a spectrometer 36.

Figure 5:
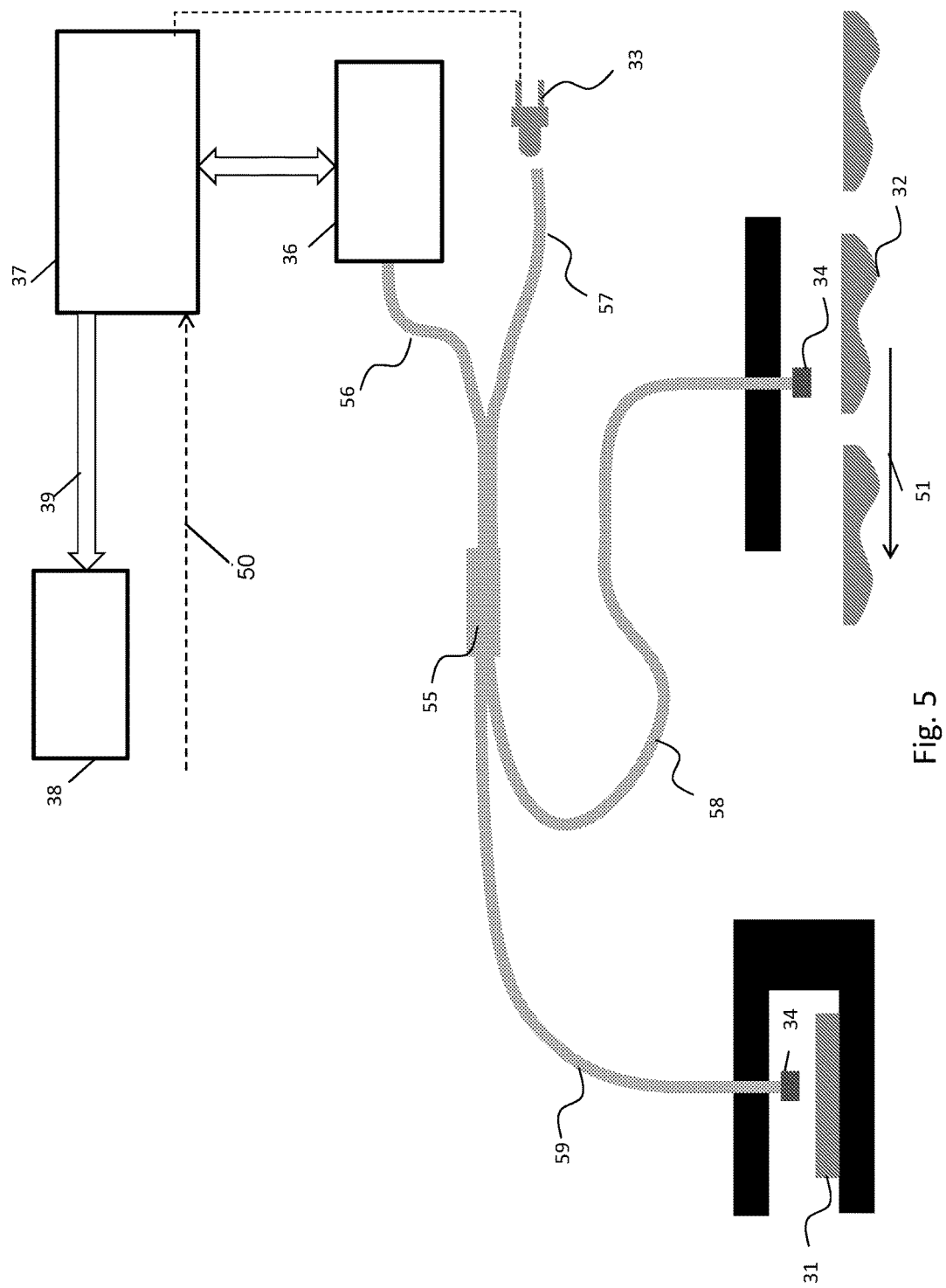
FIG. 5 schematically shows a fiber delivered lighting optical fiber based implementation example of the comparative spectral measurement masterbatch feeding screw control system, according to an embodiment of the invention.

FIG. 5 schematically shows an implementation of a system according to another embodiment of the invention, wherein a single light source 33 used. The light from source 33 passes through fiber branch 57 until it is split into two equal parts by 2×2 optical fiber splitter/combiner 55 from which light is transmitted to both measurement heads through the fiber branches 58 and 59. The return signal from both measurement heads are transmitted through the same fiber branches 58 and 59 and are combined by the same 2×2 splitter/combiner 55 and sent to the spectrometer via the fiber branch 56. Alternatively, the light source 33 may comprise a plurality of separate light sources with the same or different properties like spectral intensity distribution and power, all combined with a beam combiner into a single fiber 57. This way a specific required spectral distribution may be achieved, for example a more balanced intensity distribution spectrum may be achieved by combining a halogen lamp, lacking intensity at short wavelengths, with a blue or white light emitting diode.

In the embodiment shown in FIG. 5, separate measurements of the reference and of the in-line parts is achieved by the following method. The light source operates continuously. The reference sample 31 is always in place and its spectrum is measured by the spectrometer 36 when there is no in-line part near the measurement head. Once a discrete signal 50 from the in-line parts measurement head indicates that an in-line part moving on the production line (symbolically shown by arrow 51) is in place under the measurement head, a combined signal from the in-line part and the reference part is measured. The spectrum of the in-line part is obtained by subtracting the spectrum of the reference part from the combined signal. The inherent advantage of this embodiment of the method of the invention compared to separate intermittent illumination is that precisely the same illumination is used for measuring both the reference and the in-line parts, improving the result accuracy. However, this embodiment causes a 50% loss for the spectrum signal compared to the implementation shown in FIG. 4.

Figure 6:
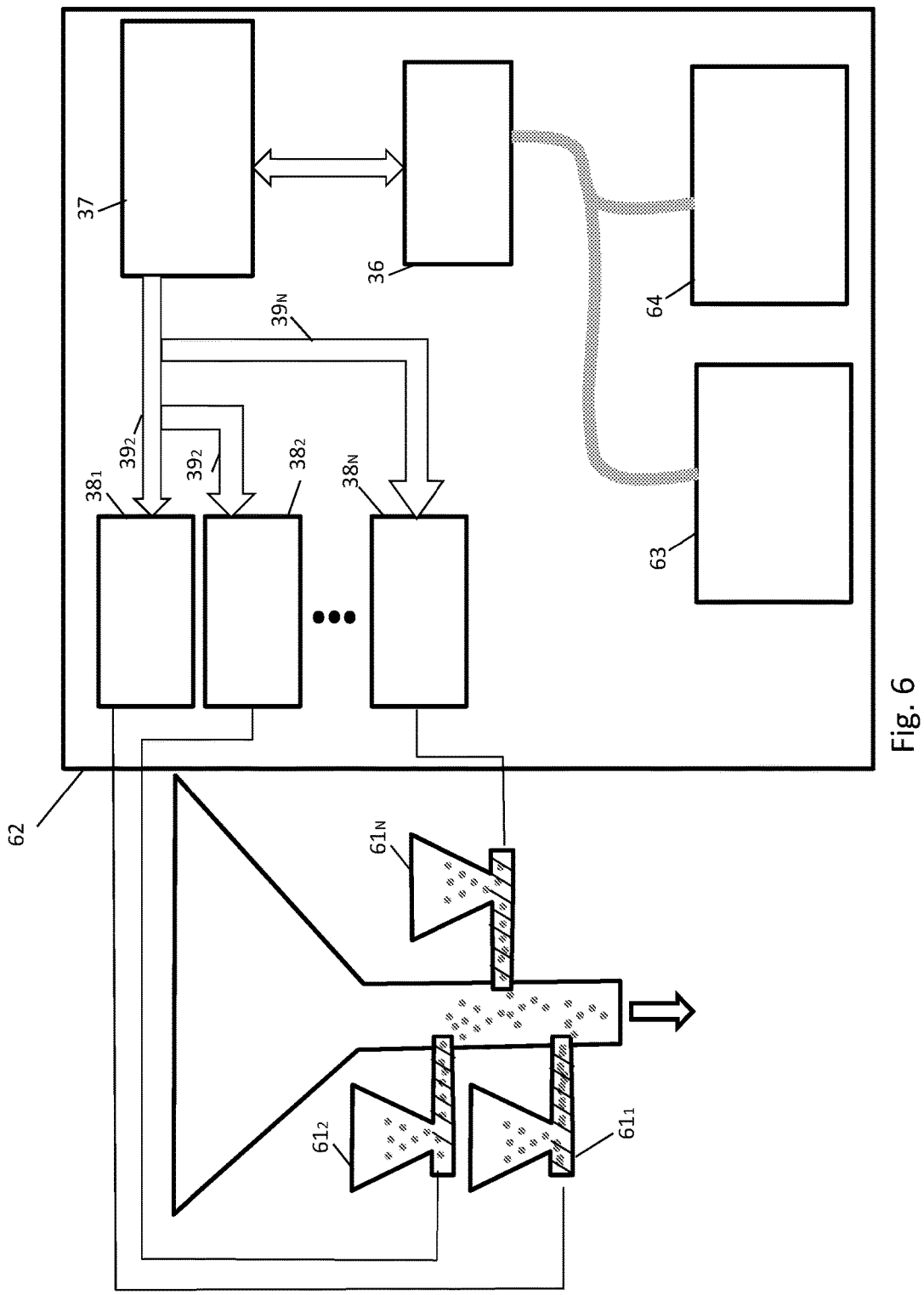
FIG. 6 schematically shows the system of the invention according to an embodiment of the invention which is intended for mixing multiple color masterbatches.

FIG. 6 schematically shows the layout of the system of the present invention which is intended for mixing multiple color masterbatches (called the "base" masterbatches) in order to obtain a mixture that results in the color of the in-line part being coincident with that of the reference part after the masterbatches are added into the processing machine. The system comprises a separate feeding module $61_1$, $61_2$, . . . $61_n$ that can be either volumetric, gravimetric or any other quantification method based (the gravimetric example is shown in FIG. 1) for each of the base masterbatches. The feeding mechanisms of those modules are controlled by a differential spectrometer system 62 that processes signal from measurement heads 63 and 64 for the reference part and the in-line parts respectively as disclosed with respect to the previous FIGS. 3-5, wherein each module is controlled by a different controller $38_1$, $38_2$, . . . $38_n$ using the method that is described herein below in FIGS. 7(a)-(b).

Figure 7B:
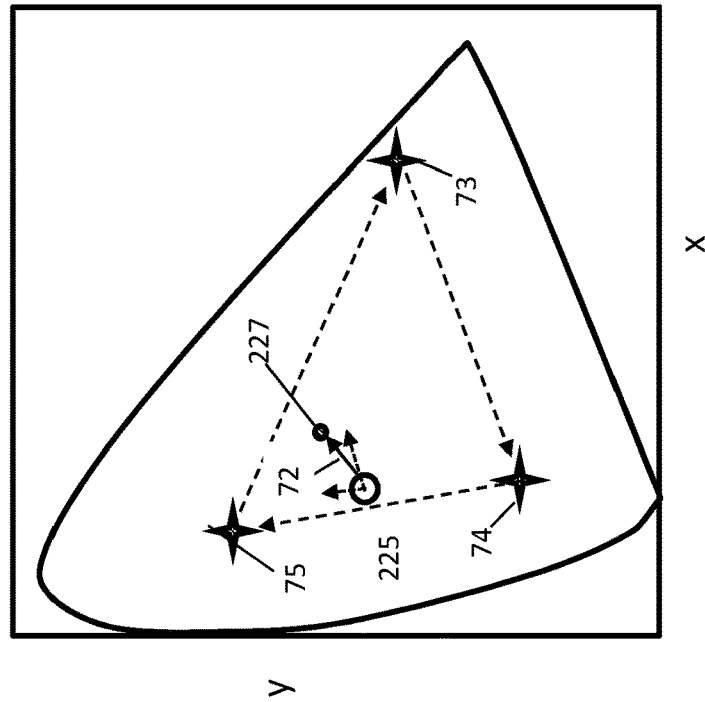
FIGS. 7(a)-7(b) schematically show an example of the method of the invention according to an embodiment of the invention to control the mixing quantities of the masterbatches.
Figure 7A:
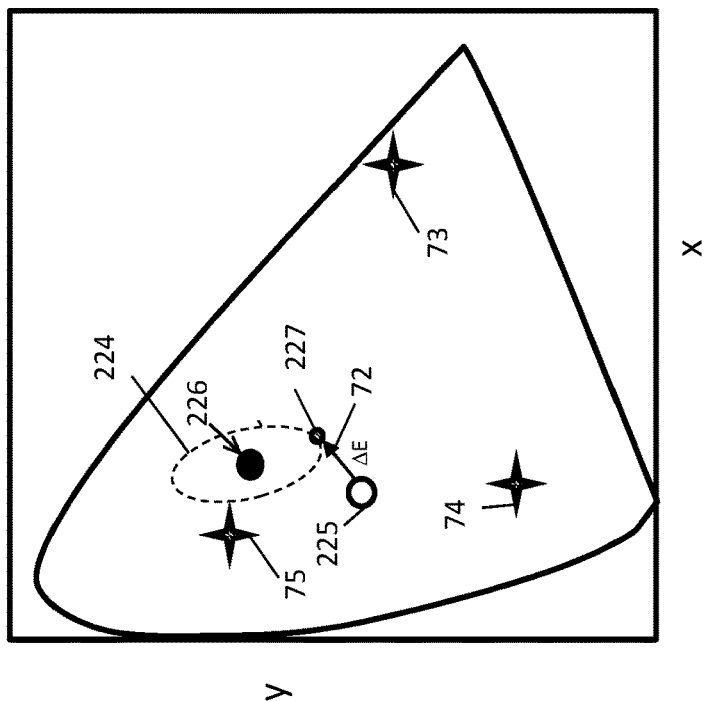

FIGS. 7(a)-(b) show an example of a method according to an embodiment of the invention, which is used to control the mixing quantities of the masterbatches. The goal of the method is to define the set point 227, which is located within the MacAdam ellipse 224 of undistinguishable colors surrounding the coordinates 226 of the reference part, at the lowest color saturation point. This ensures that the in-line part color is indistinguishable from the reference sample and the manufacturing process consumes the least amount of the masterbatch material. The output of the algorithm is the amount of increase/decrease of the percent of each particular base masterbatch in the mixture of masterbatches.

First, as can be seen in FIG. 7(a) the MacAdam ellipse 224 and the relative error ΔE 72 are calculated in the same way described above in FIG. 2. The stars 73, 74 and 75 are the color coordinates of each different base masterbatch respectively. Open circle 225 and filled circle 226 are the color coordinates of the in-line and reference parts respectively. In FIG. 7(b) the ΔE vector 72 is projected on the axes defined by vectors connected the base masterbatches. The projections are used as the error corrections $39_1$, $39_2$ . . . $39_n$ of the loops controlling the feeding screw (using a standard PI or PID control loop, as commonly done in all industrial control systems), intended to minimize the differences between the colors of the reference part and the in-line parts.

Practically, three base masterbatches are enough to span most of the colors lying within the triangle connecting them. Alternatively, more base masterbatches can be used so that more than one possibility exists to determine the component of the error vector ΔE for each of the base masterbatches. In this case a predefined merit function (for example cost or amount of added material) is used to select the optimal combination of masterbatches to minimize the error between the reference sample and the manufactured parts.

Figure 8:
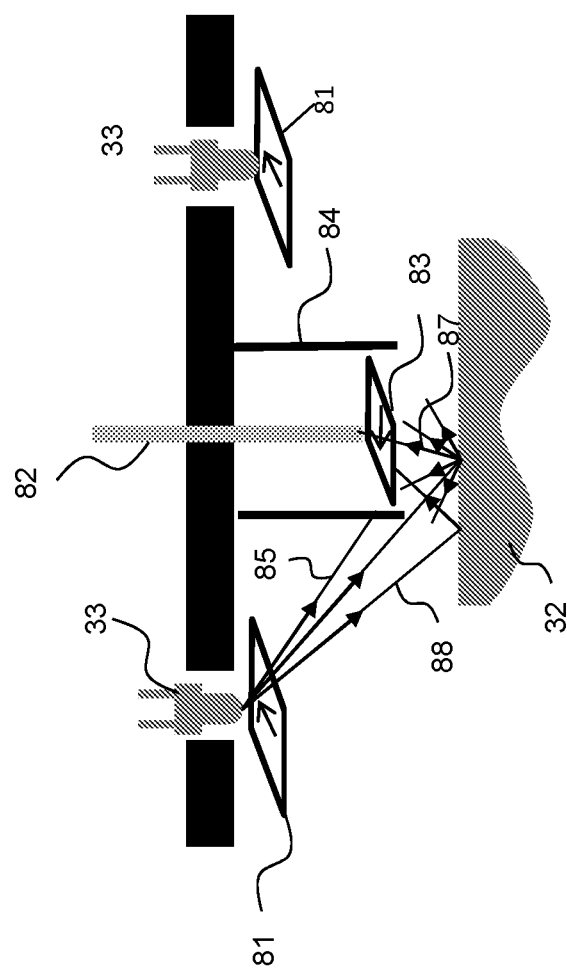
FIG. 8 schematically shows a layout of the illumination module of the invention with reduced effect of specular reflections, used for the measurement head of the comparative spectral measurement based masterbatch feeding screw control system.

FIG. 8 shows the schematic layout of an embodiment of an illumination and light collection module, i.e. a measurement head. Typically, the lighting conditions affect greatly the resulting color coordinates of the measured sample. To minimize the influence of random light on the measurements, in embodiments of the invention light baffles and optical elements are utilized to accurately control the lighting conditions in order to minimize the effect of specular reflections by accurate optical design of the illumination and light collection means.

In the embodiment shown in FIG. 8 light from the illumination source 33 passes through a polarizer 81. The light reflected from the part 32 is collected by the optical fiber 82. Another polarizer 83 with orientation perpendicular to that of polarizer 81 is introduced in front of the fiber 82. The polarizer 83 blocks most of the specular reflections and allows only diffusely scattered light to enter the collection fiber since diffuse reflections are mostly un-polarized, while specular reflection mostly maintains the incident light polarization. In order to further eliminate stray light, a baffle 84 is introduced around the fiber in order to block the stray light 85.

In other embodiments specular reflected light can be eliminated by other combinations of polarizers such as a half wave plate with linear polarizer, which is known to prevent light from being reflected backwards and circular polarizers.

Figure 9:
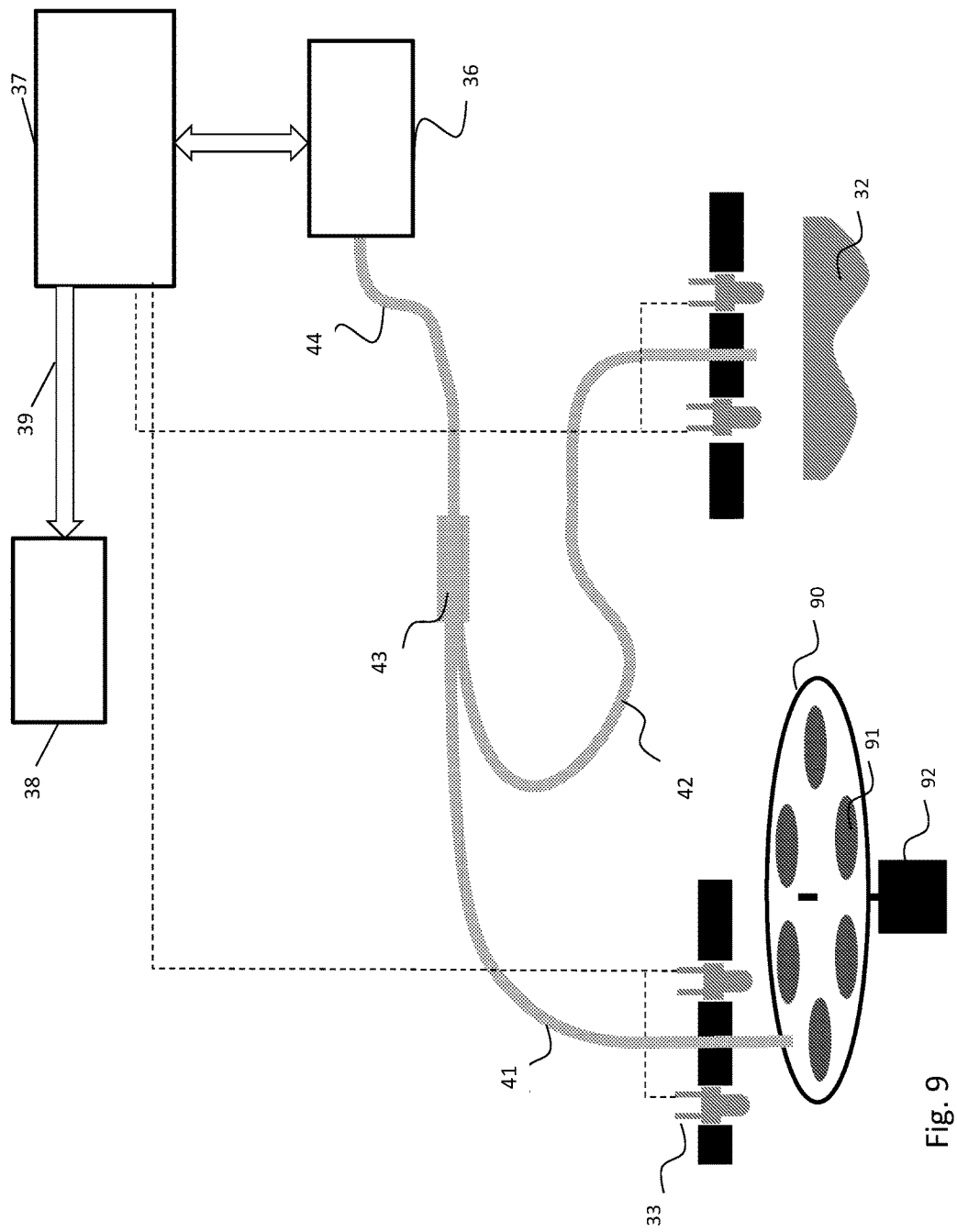
FIG. 9 schematically shows a layout of the system of the invention according to an embodiment of the present invention where the reference part is substituted by interchangeable reference samples array with known spectral properties, used for automatic absolute calibration of the spectrometer system.

FIG. 9 schematically shows a layout for an embodiment of a method for automatic absolute calibration of the differential spectrometer. Usually, in cases where there is no reference sample available, and the part color is defined by color coordinates (for example xyY, Lab, Luv, HSV, sRGB, XYZ or others) there is a need to define the reference point 226 in FIG. 2(c) numerically. In order to do so, the measurement of the color of the manufactured parts should be calibrated to absolute color coordinates. However, in the system of the present invention, the absolute color coordinates are parameters that are not required while using differential measurement as disclosed herein. The present invention discloses a method for automatic on-line calibration of the system without operator intervention eliminating the need for accurate periodic calibrations, which require highly qualified personnel and are sensitive to changes in environmental conditions, vary with time, etc.

As can be seen in FIG. 9, a single reference sample is replaced by an array 90, which contains a plurality of reference samples 91 having distinct known spectral properties. This array 90 of reference samples 91 is attached to actuation means 92 capable of moving reference samples 91 so that the spectrum of only one of them is measured at a time. The reference samples can either reflect the light from source 33 as shown in FIG. 9 or transmit the incident light, in which case the reference sample should be located between the illumination means 33 and the measurement fiber 42.

The calibration procedure is activated periodically, by measuring each of the reference samples. The present invention system's spectral response calculation is performed from the comparison of the measured spectra with the known one for each sample. One example of such a calculation is to divide the obtained spectrum by the known one for each sample and averaging the results for a plurality of reference samples. Other more sophisticated and accurate methods for calculation of the system response from the plurality of known reference samples measurements are known.

Figure 10:
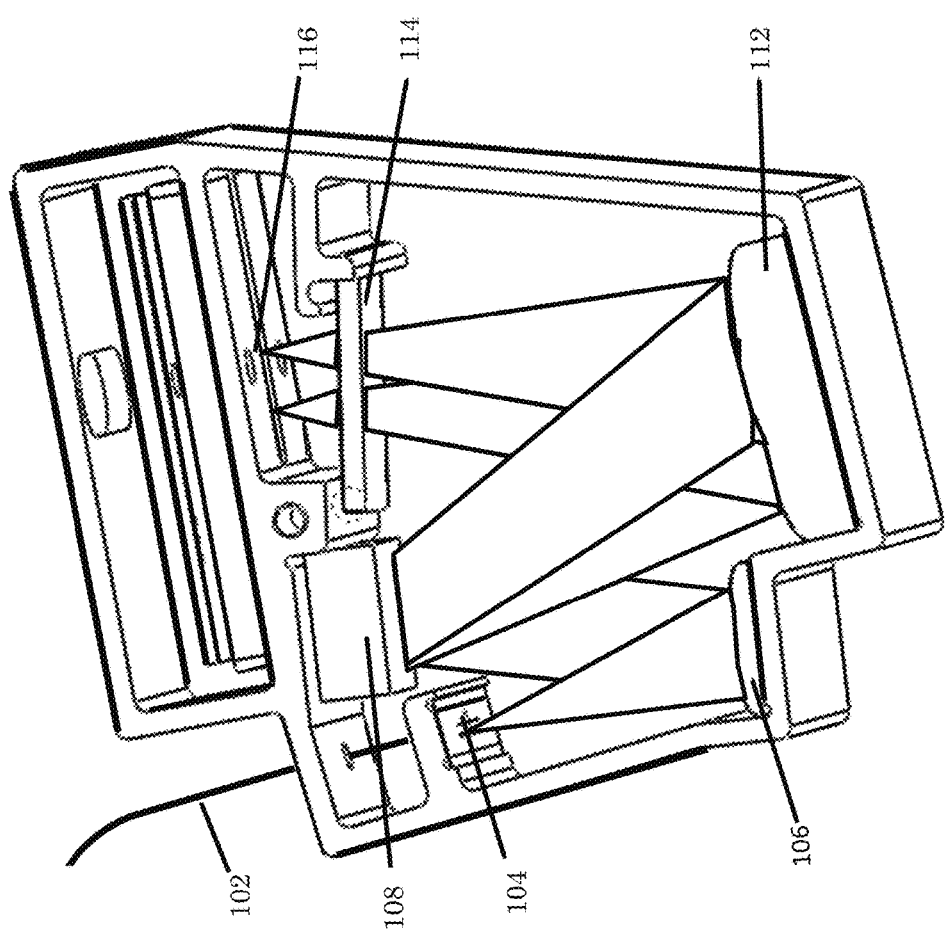
FIG. 10 schematically shows an embodiment of spectrometer 36 that can be used to carry out the invention.

FIG. 10 schematically shows an embodiment of spectrometer 36 that can be used to carry out the invention. The optical layout of this embodiment of spectrometer 36 is based on a well-known Czerny-Turner monochromator with the addition of a correction element before the linear sensor array that is introduced in order to compensate for aberrations of the optical elements. Use of this correction element enables low f-number designs within compact physical dimensions.

In FIG. 10, the collected light is transmitted to the spectrometer 36 by optical fiber 102. The input fiber light is limited in the horizontal direction by a vertical slit 104 ranging from 10-500 microns in width, depending on the required resolution. The light passing through slit 104 is reflected from a first concave mirror 106 located at a distance equal to its focal length from slit 104 in order to collimate the light from the fiber 102. The collimated beam is diffracted by a diffraction grating 108 having, for example, 300 grooves/mm and focused by a second concave mirror 112 onto a sensor array 116 after passing through a corrector element 114. In the simplest case the corrector element 114 is a cylindrical lens that compensates for the strong astigmatism from the angled mirrors. This arrangement allows optical resolution below 10 nm with 1 mm input optical fiber with a numerical aperture 0.5. In a more complex setting allowing higher resolution, more complex correction elements might be used, e.g. phase masks, diffractive elements, or multiple optical elements.

FIGS. 11(a) and 11(b) schematically show in more detail an example of an optical probe assembly comprising two measurement heads such as shown in FIG. 5. FIG. 11(a) is an overall view of the assembly and FIG. 11(b) is a magnified view of section A in FIG. 11(a) showing the internal features of the branches. Light from an illumination source is introduced into two optical fibers 57a and 57b within the illumination branch 57. After passing through a 2×2 optical fiber splitter/combiner 55 each fiber 57a and 57b is further guided by a separate branch 58 and 59 to measurement heads 110 and 111 for the in-line part and reference parts respectively. Fibers 112a and 112b within branches 58 and 59 return light collected by measuring heads 110 and 111 respectively and either pass through optical fiber splitter/combiner 55 to separate signal branches 56a and 56b or are optionally combined by the optical fiber splitter/combiner 55 into a single signal branch 56 as in FIG. 5.

Figures 12A, 12B:
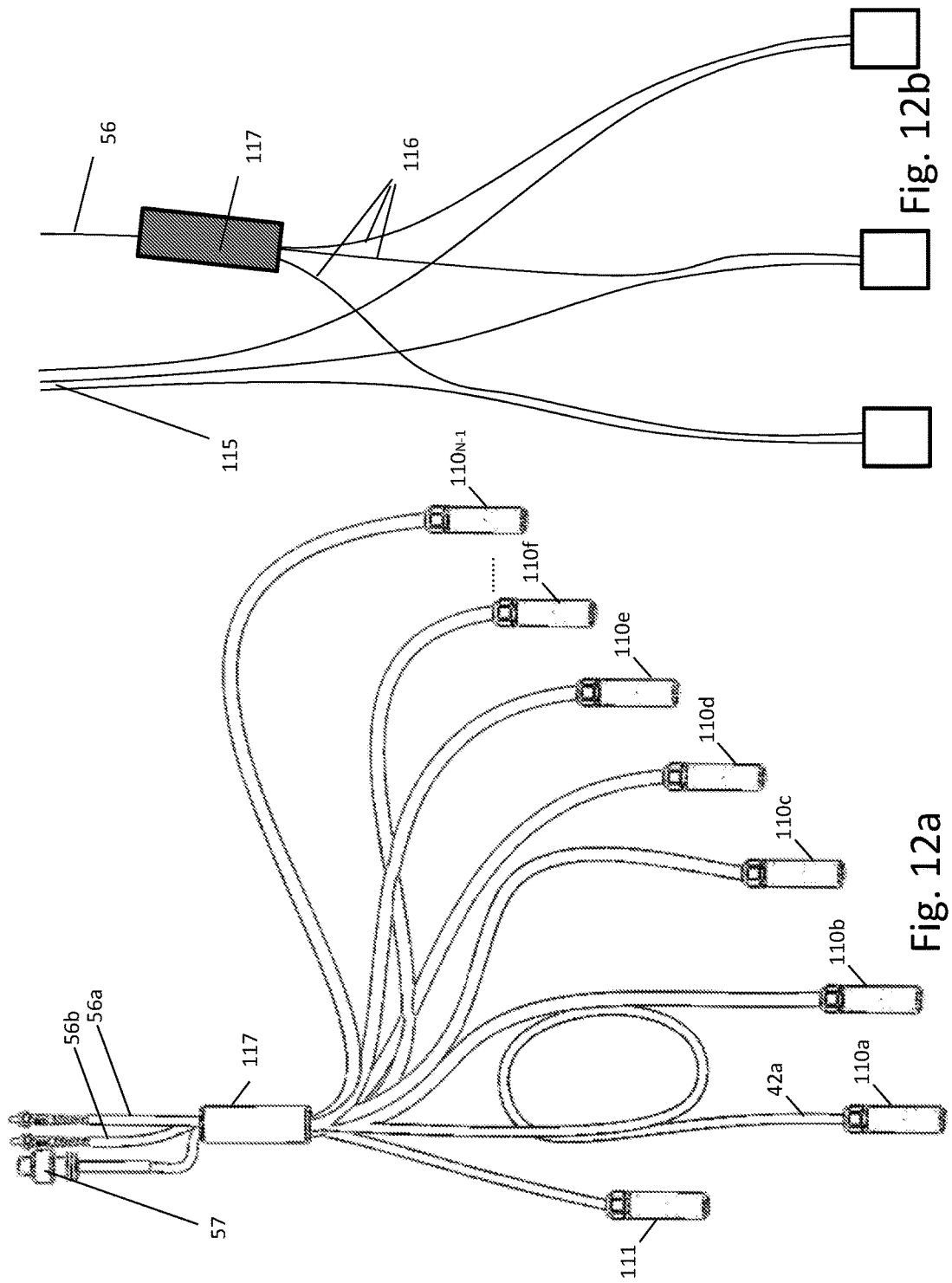
FIGS. 12(a) and 12(b) schematically show in more detail an example of an optical probe assembly comprising multiple measurement heads such as shown in FIG. 4(c)

FIGS. 12(a) and 12(b) schematically show in more detail an example of an optical probe assembly comprising multiple measurement heads such as shown in FIG. 4(c). FIG. 12(a) is a schematic view of the various branches bringing light to and collected light from the measurement heads 110a-110n-1 and 111. FIG. 12(b) schematically shows the routing of the illumination fibers 115 and the collection fibers 116 within the optical probe assembly wherein the collection fibers 116 are combined into a single fiber using a n×1 optical fiber combiner 117.

Figure 13:
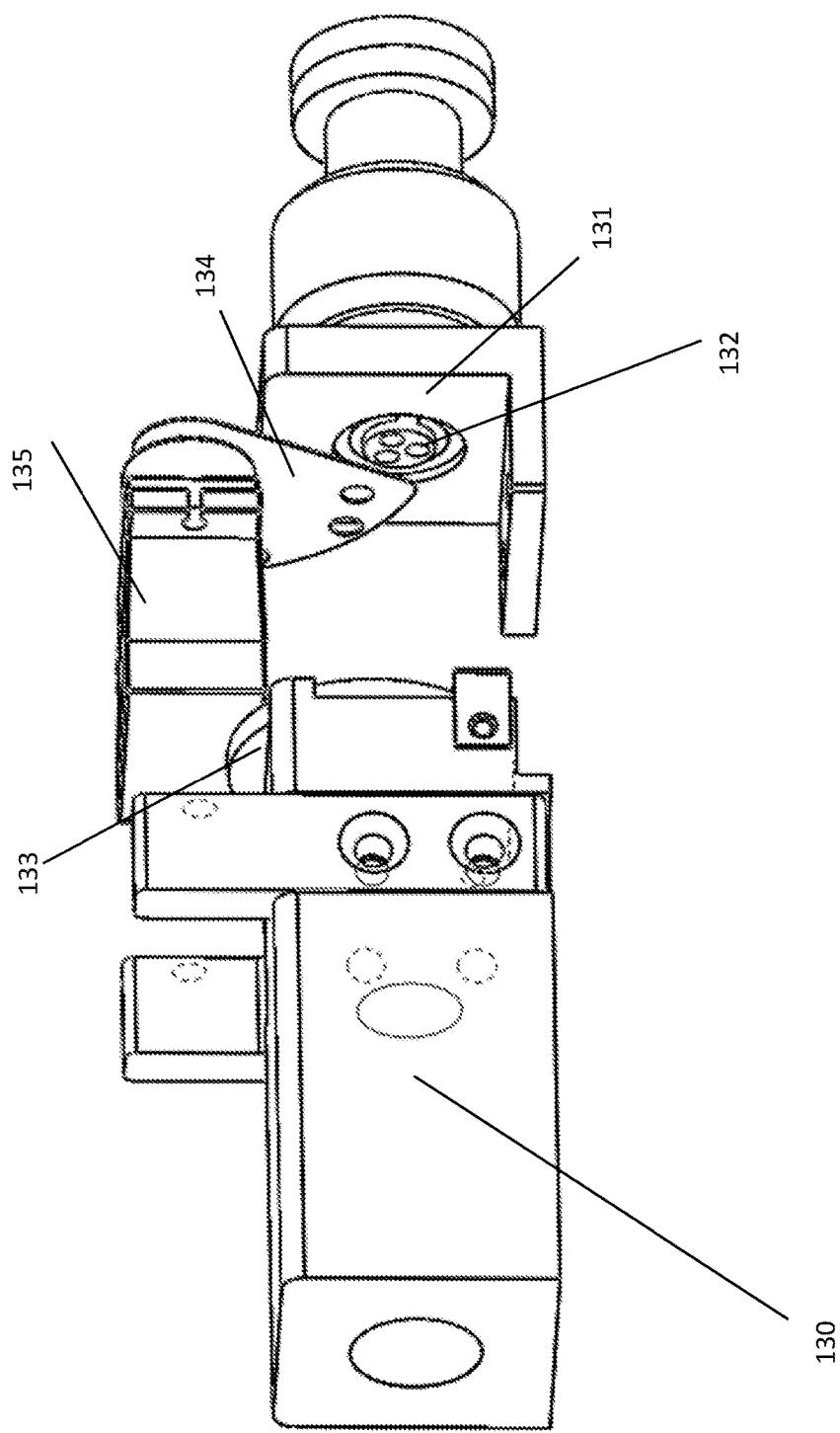
FIG. 13 schematically shows an embodiment of a setup for introducing a single light source into a plurality of optical fibers while only one fiber at a time is illuminated.

FIG. 13 schematically shows an embodiment of a setup for introducing a single light source into a plurality of optical fibers while only one fiber at a time is illuminated. The light source 130, which is optionally followed by an optical system to create a uniform light distribution at the plane 131 of the facets 132 of the optical fibers, is filtered by optical filter 133 to remove all unnecessary radiation in order to decrease the heat load on fiber facets. For color measurement applications, the filter reflects infrared and transmits visible light. An opaque disk 134 with a plurality of holes is attached to a servo motor 135. The locations of the holes are determined in such a way that as the disk rotates, a different fiber fact is illuminated, while light to all the others is blocked. Alternatively, a steadily rotating DC motor can be used with a disk having tangential slits rather than holes, sequentially exposing each fiber for a predetermined period of time.

Figure 14A:
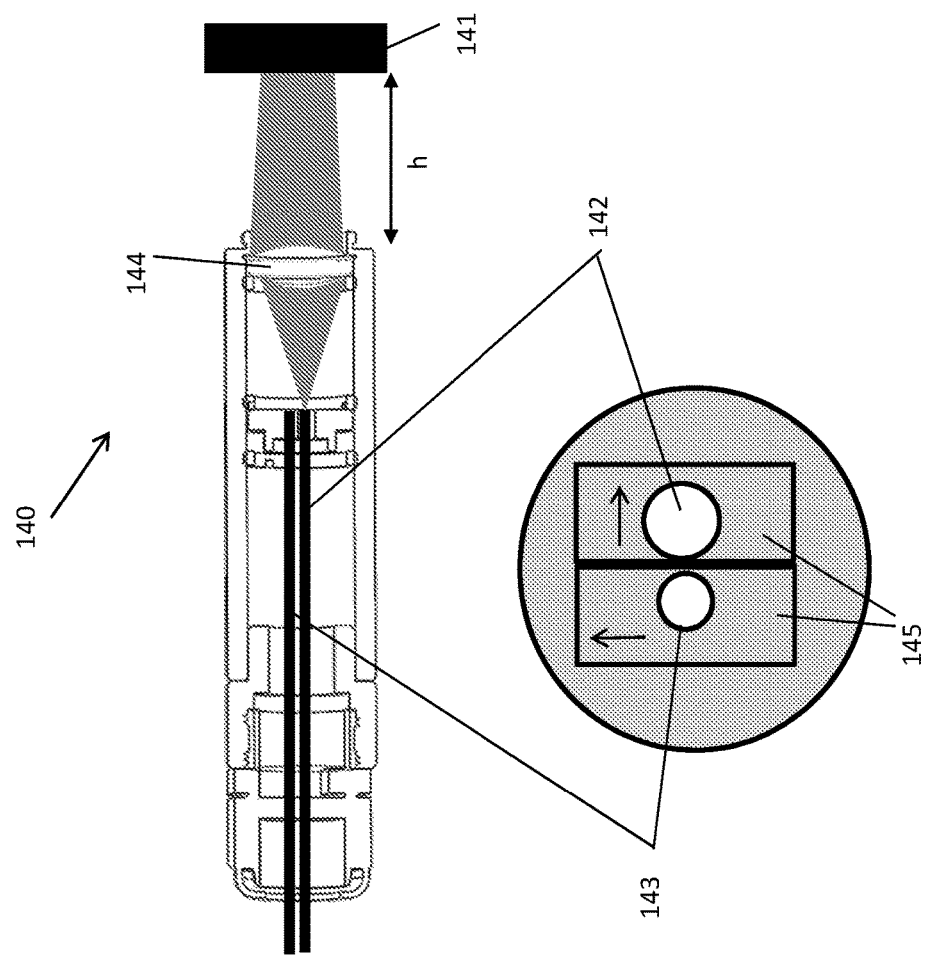
FIG. 14(a) schematically shows an embodiment of an optical layout for a measurement head for use in reflective measurements.

FIG. 14(a) schematically shows an embodiment of an optical layout for a measurement head for use in reflective measurements. In this embodiment the measurement head 140 is located at a distance h from the front surface of sample 141. This design addresses two issues with remote color measurement—dependence on the distance to the sample and dependence on the surface angle due to a varying amount of specular reflections entering the collection system. The optical design allows minimization of both effects. Both illumination fibers 142 and light collection fibers 143 are located near the focal point of the aspheric or spherical lens 144. Using a 0.25-3 mm diameter optical fiber for illumination and an aberration minimized lens, the light distribution on the sample surface is such, that the reflected light collected by the collection fiber is independent of the distance to the sample surface within at least half of the lens focal length. This effect is shown in the FIG. 14(c), which is a graph showing the dependence of the color difference between the reference and the sample parts on the distance from the lens of the measurement head to the sample part surface. The surface angle dependence effect is minimized by introducing two crossed polarizers (i.e. for example two linear polarizers wherein one is vertically oriented on the other is horizontally oriented as indicated by arrows in the section view of FIG. 14(a)). The polarizers block both light scattered from the lens surface and the specular reflection from the sample surface.

Figure 14B:
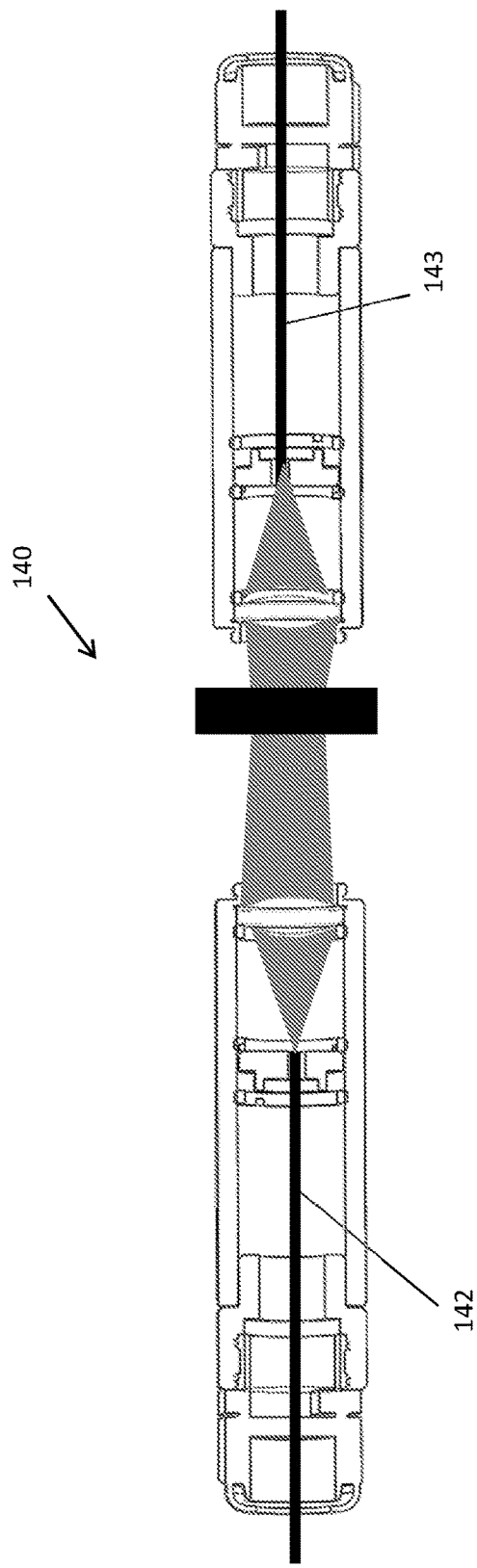
FIG. 14(b) schematically shows an embodiment of an optical layout for a measurement head for use in transmissive measurements.
Figure 14C:
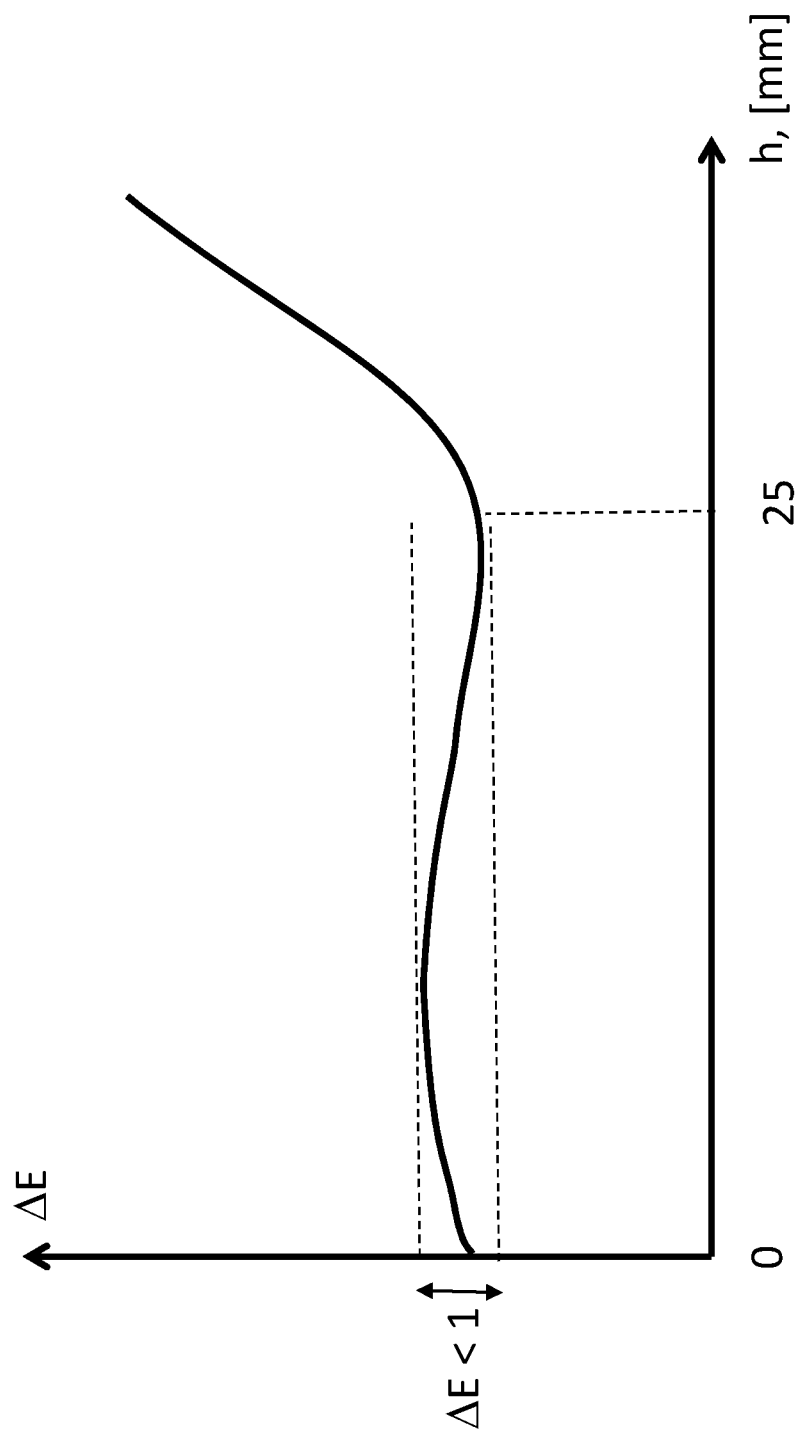
FIG. 14(c) shows an example of the dependence of the color difference between the reference and the sample parts on the distance from the lens of the measurement head to the sample part surface.

FIG. 14(b) schematically shows an embodiment of an optical layout for a measurement head for use in transmission color measurement, wherein the illumination and collection fibers are located at opposite sides of the sample.

Although embodiments of the invention have been described by way of illustration, it will be understood that the invention may be carried out with many variations, modifications, and adaptations, without exceeding the scope of the claims.

The invention claimed is:

1. A system for controlling the concentration of at least one colorant in the mixture of raw material fed to a product production machine in order to optimize the match of the color of an in-line part manufactured by the product production machine to the color of a reference part, the system comprising:
   a. one white light source;
   b. at least one measurement head configured for projecting light received from the one white light source onto an in-line part and collecting light reflected from or transmitted through the in-line part and transferring the collected light to a spectrometer;
   c. at least one measurement head configured for projecting light received from the one white light source onto a reference part and collecting light reflected from or transmitted through the reference part and transferring the collected light to the spectrometer;
   d. a spectrometer;
   e. a first optical network adapted to provide illumination light from the at least one light source to each of the measurement heads;
   f. a second optical network to guide return light that is either reflected from the surface of or transmitted through the in-line part and reference parts from each of the measurement heads to the spectrometer;
   g. a spectrum processing and control unit configured to receive electric signals representative of the spectra of the in-line part and reference parts from the spectrometer, to process the signals and to determine error signals that are sent to at least one feed controller;
   h. at least one feed controller for each colorant, each feed controller configured to receive an error signal from the spectrum processing and control unit and to send it to a colorant feed controller; and
   i. at least one colorant feed controller for each colorant, each colorant feed controller configured to adjust the concentration of the colorant base in the mixture of raw material fed to the product production machine by optimizing the rate at which the colorant is added to the raw material;
   the system characterized in that each of the measurement heads comprises: (i) a first facet of an illumination optical fiber configured to conduct light from the one light source to a sample via the first optical network, wherein the sample is one of an in-line part and a reference part; and (ii) a first facet of a collection optical fiber configured to conduct light reflected from or transmitted through the sample to the spectrometer via the second optical network;
   wherein the measurement head is characterized in that it comprises two crossed polarizers, a first of the crossed polarizers located at the first facet of illumination optical fiber and a second of the crossed polarizers located at the first facet of collection optical fiber; wherein each of the first and the second crossed polarizers is located near the focal point of one or a plurality of aspheric or spherical lenses when the collection optical fiber conducts light reflected from the sample or each of the first and the second crossed polarizers is respectively located near the focal point of one or two or a plurality of aspheric or spherical lenses when the collection optical fiber conducts light transmitted through the sample; the one lens or two lenses configured to collimate light emitted from the first facet of illumination optical fiber and to direct it onto the sample and to collect light reflected from or transmitted through the sample and to direct the collected or reflected light into the first facet of collection optical fiber.

2. The system of claim 1, wherein the measurement heads comprise light baffles, which in addition to the polarizers reduce the effects of specular reflections and stray light.

3. The system of claim 1, wherein the first optical network comprises one of:
   a. a 1×N optical fiber splitter that divides light from a single fiber, which is optically coupled to the light source, to one or more fibers that conduct light from the optical fiber splitter to the measurement heads; and
   b. an apparatus located in front of the light source, the apparatus comprising a motor and a rotatable disk, which comprises at least one hole or slit, the apparatus configured such that, when the motor is activated to rotate the disk, light is able to enter only one of the facets at a time of a plurality of optical fibers that each lead to a measurement head.

4. The system of claim 1, comprising an array of reference samples located on a mechanism configured to place one of the reference samples at a time opposite a measurement head.

5. The system of claim 1, wherein the spectrometer is a Czerny-Turner monochromator comprising a grating to diffract the return light from the measurement heads, a linear sensor array at its output to detect the diffracted light, and a corrector element or elements to compensate for aberrations of the optical elements.

6. The system of claim 1, wherein the products manufactured are plastic products produced by plastic product production machines and the colorants are known as masterbatches.

7. The system of claim 1 wherein the distances between the polarizers and the focal point of the lenses is chosen such that the change of the measured signal with the distance between the probe and the sample is minimized.

8. A system for controlling the concentration of at least one colorant in the mixture of raw material fed to a product production machine in order to optimize the match of the color of an in-line part manufactured by the product production machine to the color of a reference part, the system comprising:
   a. one white light source;
   b. a mechanism for alternately moving one of the reference part or the in-line part under a measurement head, wherein the measurement head is configured for: (i) projecting light received from the one white light source onto the in-line part and collecting light reflected from or transmitted through the in-line part and transferring the collected light to a spectrometer, and (ii) projecting light received from the one white light source onto the reference part and collecting light reflected from or transmitted through the reference part and transferring the collected light to the spectrometer;

c. a spectrometer;
d. a first optical network adapted to provide illumination light from the light source to the measurement head;
e. a second optical network to guide return light that is either reflected from the surface of or transmitted through the in-line part of the reference part from the measurement head to the spectrometer;
f. a spectrum processing and control unit configured to receive electric signals representative of the spectra of the in-line part and reference parts from the spectrometer, to process the signals and to determine error signals that are sent to at least one feed controller;
g. at least one feed controller for each colorant, each feed controller configured to receive an error signal from the spectrum processing and control unit and to send it to a colorant feed controller; and
h. at least one colorant feed controller for each colorant, each colorant feed controller configured to adjust the concentration of the colorant in the mixture of raw material fed to the product production machine by optimizing the rate at which the colorant is added to the raw material;

the system characterized in that the measurement head comprises: (i) a first facet of an illumination optical fiber configured to conduct light from the light source to a sample via the first optical network, wherein the sample is one of an in-line part or a reference part; and (ii) a first facet of a collection optical fiber configured to conduct light reflected from or transmitted through the sample to the spectrometer via the second optical network;

wherein the measurement head is characterized in that it comprises two crossed polarizers, a first of the crossed polarizers located at the first facet of illumination optical fiber and a second of the crossed polarizers located at the first facet of collection optical fiber; wherein each of the first and the second crossed polarizers is located near the focal point of one or a plurality of aspheric or spherical lenses when the collection optical fiber conducts light reflected from the sample or each of the first and the second crossed polarizers is respectively located near the focal point of one or two or a plurality of aspheric or spherical lenses when the collection optical fiber conducts light transmitted through the sample; the one lens or two lenses configured to collimate light emitted from the first facet of illumination optical fiber and to direct it onto the sample and to collect light reflected from or transmitted through the sample and to direct the collected or reflected light into the first facet of collection optical fiber.

* * * * *